(12) United States Patent
Liaw et al.

(10) Patent No.: US 7,205,359 B2
(45) Date of Patent: Apr. 17, 2007

(54) FUNCTIONAL NORBORNENES AS INITIATORS FOR RADICAL POLYMERIZATION, THEIR POLYMERIC DERIVATIVES AND A PROCESS FOR PRODUCING THE SAME

(75) Inventors: Der-Jang Liaw, Taipei (TW); Ching-Cheng Huang, Taipei (TW)

(73) Assignee: National Taiwan University of Science & Technology, Taipei (TW)

( * ) Notice: Subject to any disclaimer, the term of this patent is extended or adjusted under 35 U.S.C. 154(b) by 302 days.

(21) Appl. No.: 10/777,054

(22) Filed: Feb. 13, 2004

(65) Prior Publication Data

US 2005/0182220 A1  Aug. 18, 2005

(51) Int. Cl.
C08G 61/08 (2006.01)
C08F 271/02 (2006.01)

(52) U.S. Cl. ............ 525/288; 525/245; 525/269; 525/279; 525/289; 525/301; 525/303; 525/308

(58) Field of Classification Search ......... 525/245, 525/269, 279, 288, 289, 301, 303, 308
See application file for complete search history.

(56) References Cited

OTHER PUBLICATIONS

Der-Jang Liaw and Ching-Cheng Huang, "Preparation of New Diblock Polymeric Materials With Carbazole Groups . . . ", Polymer Preprints, 2003, 44(1), 945-946.{{.*
Roh, et al., "Block and Random Living, Ring-Opening Metathesis Copolymerization of Functionally Differentiated Carbazole-Containing Norbornene Monomers", Adv. Synth. Catal. 2002, 344, No. 2, 192-199.*

* cited by examiner

*Primary Examiner*—Fred Teskin
(74) *Attorney, Agent, or Firm*—Birch, Stewart, Kolasch & Birch, LLP

(57) ABSTRACT

The present invention relates to novel functional norbornenes as initiators for radical polymerization, its polymer and a process for producing the same. More particularly, the novel functional norbornenes can be selectively polymerized by ring-opening metathesis polymerization or radical polymerization to obtain various polynorbornene derivatives or grafted copolymer materials. The polynorbornene derivatives and grafted copolymer materials not only exhibit excellent functional properties but also enhanced physical and chemical properties after modification. The polynorbornene derivatives and grafted copolymer materials disclosed in the present invention exhibit excellent heat resistance, transparency and water resistance. The present invention also deals with a process for producing such derivatives and materials having controllable molecular weight with narrow molecular weight distribution.

5 Claims, 5 Drawing Sheets

FUNCTIONAL NORBORNENES AS INITIATORS FOR RADICAL POLYMERIZATION, THEIR POLYMERIC DERIVATIVES AND A PROCESS FOR PRODUCING THE SAME

BACKGROUND OF THE INVENTION

1. Field of the Invention

The present invention relates to a series of high performance polymeric materials derived from norbornene derivatives, particularly, the present invention relates to novel functional norbornenes as initiators for radical polymerization, their polymer and a process for producing the same.

2. Description of Related Art

Up to now, polycarbonate (PC) has been used as macromolecular material for optical purpose. The most important considerations, which may influence the use of the optical material, include birefringence and water adsorption. Accompanying with the development of high-density compact disk, it becomes more and more difficult for those prior art polymers to meet the requirements. Hence, it is desirable to develop a polymeric material having lower birefringence and water absorption.

For this reason, a commercial material ZEONEX has been developed in Japan (Nippon Zeon). It is the polynorbornene which has lower birefringence, lower water adsorption and better optical characteristics. Such material can be prepared by ring-opening metathesis polymerization of a norbornene monomer in the presence of a metathesis catalyst and hydrogenated to become a saturated polynorbornene.

Along with the development of high-density compact disk, a method for producing a new polymeric material with lower birefringence and high transmittance for low wavelength range (blue light) is developed. The polynorbornene is such a noncrystal optical material that its transmittance with respect to the light having a wavelength of about 400 nm may approach to 90%. The reason is that there is no aromatic ring contained in the main chain. In addition, there is also no hydrophilic functional group contained in the main chain of this polymer, so the ratio of water adsorption may approach to a value below 0.01%. Under the same condition, the polynorbornene has water absorption ratio far lower than that of the polycarbonate (PC). In the aspect of heat resistance, the glass transition temperatures of the polynorbornene and polycarbonate (PC) fall within the same temperature range (about 123° C.). Hence, there is a need for the development of such a material in the industry at the present time and in the future.

In recent years, attention has been paid to hydrogenated products of polymers produced by ring-opening metathesis polymerization of norbornene-type monomers such as tetracyclododecene, dicyclopentadiene (DCP), and tricyclopentadiene, etc. These hydrogenated products can serve as an optical material for use in an optical disk, optical lens, or transparent film, etc. (please refer to JPO60-26024, JPO1-24826, JPO63-264626, EP303, 246, JPO-63-317520 and JPO-1-132656). The reason therefore is that such hydrogenated products have excellent transparency and heat resistance and hardly susceptible to moisture gain and that they have comparatively small briefringence and excellent moldability.

Olefin metathesis polymerization is a popular method in polymer synthesis. In recent years, the ring-opening metathesis polymerization of cycloolefin and the metathesis polymerization of non-cyclodiolefin are become very important in polymer synthesis. Accompanying with the developments of new catalysts, the synthesis method of polymeric materials which contain various functional groups is developed correspondingly.

Organometallic catalysts have been used in metathesis polymerization for a long time. However, those organometallic catalysts are not suitable in metathesis polymerization of the monomer which contains various functional groups and is also sensitive to moisture and oxygen gas. For example, tungsten (W), titanium (Ti), molybdenum (Mo) and ruthenium (Ru) catalysts are the most popular catalysts are used in the ring-opening metathesis polymerization of cycloolefin, wherein, ruthenium (Ru) catalyst is the most tolerant catalyst with respect to water and oxygen gas in the metathesis polymerization. The metathesis polymerization can even be carried out in an aqueous solution in the presence of ruthenium (Ru) catalyst. For example, the catalyst of $\{Cl_2Ru(CHPh)[P(C_6H_{11})_3]_2\}$ developed by Grubbs et al. in 1996 is good for ring-opening metathesis polymerization of cycloolefin. More particularly, the polymerization of the monomers with functional groups can be carried out in the presence of such a catalyst because it is stable in the air. In addition, such metathesis polymerization has a property of high polymerizing rate and large molecular weight of resulting polymer. Generally speaking, such reaction has accompanied with living polymerization.

The ring-opening metathesis polymerization of a norbornene-type monomer is carried out, in general, in the presence of (1) a catalyst system consisting of an organometallic compound such as an organoaluminum compound and a tungsten and/or molybdenum-based metathesis catalyst (please refer to JPO46-14910) or (2) a catalyst system containing an organometallic compound such as an organoaluminium compound and a transition-metal compound such as titanium tetrahalide (please refer to JPO41-20111 and JPO50-12199).

However, in the case of the ring-opening polymerization using the first kind of catalyst system as described above, the resultant polymer has a broad distribution of molecular weight and thus has high birefringence, in spite of an advantage that the polymer can be obtained at such high yields that the residual monomer is hardly present in the reaction system when the reaction has completed.

In the case of the ring-opening polymerization using the second kind of catalyst system as described above, the molecular weight distribution of a resulting polymer can be easily controlled. However, as the concentration of a monomer in the reaction system decreases, the rate of polymerization also decreases greatly. Hence, polymers by the ring-opening metathesis polymerization (ROMP) of the present catalyst system cannot be obtained in high yields. Moreover, a large amount of unreacted monomers remains in the reaction system when the polymerization has completed. It is very difficult to remove this unreacted monomer during the purification of the polymer.

Hence, the extensive research on ring-opening metathesis polymerization (ROMP) of cycloolefin derivatives to improve the reactivity of catalyst. The research mainly also focused on the development of side-chain-type liquid crystal, a triblock copolymer synthesized by two-step method, a polymer with various functional groups and a polymer having cross-linkable functional groups remained in the side chain thereof, etc. The introduction of the functional groups improves the optical characteristics and biochemical activity of the polymer. In addition, the cross-linkable functional groups such as methacryloyl in the side-chain can be introduced and applied as UV curing agent, coating material and photoresist.

The polynorbornene and its derivatives are the first commercial products by ring-opening metathesis polymerization (ROMP). They are one of the important engineering materials. Those materials are used with shape-memory polymers, shining apparatus, machine, electrical elements, tube, food packages and the like because of their good transmittance, large usable temperature range, good mechanical property and excellent moldability. In addition, the derivatives of polynorbornene such as acidic and aromatic polymers can serve as a photoresist and can be used in semiconductor manufacturing process.

Although the polynorbornene and its derivatives have good transmittance, wider usable temperature range, good mechanical property and excellent moldability, the technology of synthesizing new norbornene-type monomer and its polymers are not well developed and the problems associated with the preparation of the polymer are not easy to overcome. Hence, the development of new norbornene-type monomers and their derivatives has great potential in various applications.

The present invention provides novel functional norbornenes as initiators for radical polymerization, its polymer and a process for producing the same. More particularly, the polymerization of novel functional norbornenes in the present invention can be selectively carried out by ring-opening metathesis polymerization (ROMP) or radical graft copolymerization to obtain various polynorbornene derivatives (Macromonomer, macroinitiator, homopolymer, random copolymer and block copolymer) or grafted copolymer materials (Branched polymeric materials). The polynorbornene derivatives and grafted copolymer materials not only exhibit excellent functional properties but also enhanced physical and chemical properties after modification.

SUMMARY OF THE INVENTION

First objective of the present invention is to provide a novel initiator (NBMBrMP) for radical polymerization. A novel initiator was synthesized by the reaction of norbornene methylene amine with 2-bromo-2-methylpropionyl bromide (Scheme I). Novel macromonomer, polymethylmethacrylate containing norbornyl end group (NBPMMA), was prepared by radical polymerization using NBMBrMP as an initiator (Scheme II). Poly(macromonomer), poly(N-BPMMA) with high molecular weight (Mn=6.8×10$^4$) was obtained by polymerizing relatively low molecular weight (Mn=6.4×10$^3$) NBPMMA. Since, homopolymerization of NBPMMA macromonomer with number average molecular weight (Mn) 1.3×10$^4$ did not undergo ring-opening metathesis polymerization (ROMP) with Ru complex {Cl$_2$Ru (CHPh)[P(C$_6$H$_{11}$)$_3$]$_2$}, ring-opening metathesis copolymerization of macromonomer containing norbornene end group (NBPMMA) and norbornene derivative containing carbazole group (NBCbz) was investigated. The random copolymer, poly(NBPMMA-co-NBCbz) with number-average molecular weight (Mn) 4.8×10$^4$ and molecular weight distribution (PDI) 1.78 (Scheme III) was successfully obtained. Fluorescence spectrum of poly(NBPMMA-co-NBCbz) exhibited strong emissions at 370 nm, 385 nm, 410 nm and 440 nm due to carbazole group. Poly(NBPMMA-co-NBCbz) did not exhibit Tg; however, NBPMMA macromonomer (Mn=1.3×10$^4$) exhibited Tg at 110° C. due to polymethylmethacrylate segment. In addition, a new macroinitiator, poly(HNBMBrMP), for radical polymerization was also synthesized by ROMP and then hydrogenated (Scheme IV). Graft copolymerization of poly(HNBMBrMP) with MMA was carried out in diluted macroinitiator solution ([poly(HNBMBrMP)]=3.64×10$^{-2}$ mol·L$^{-1}$ in toluene) to yield poly(HNBMBrMP-g-PMMA) [Mn=2.0×10$^4$, PDI=1.9] (Scheme IV). The signals of amide hydrogen (6.7 ppm), PMMA segment [—C$\underline{H}_2$C(CH$_3$)COOCH$_3$: 1.8~1.9 ppm, —CH$_2$C(C$\underline{H}_3$)COOCH$_3$: 0.9~1.6 ppm and —CH$_2$C (CH$_3$)COOC$\underline{H}_3$: 3.4 ppm] were appeared in the $^1$H NMR spectrum. The GPC results and the $^1$H NMR spectral data confirmed the formation of the poly(HNBMBrMP-g-PMMA).

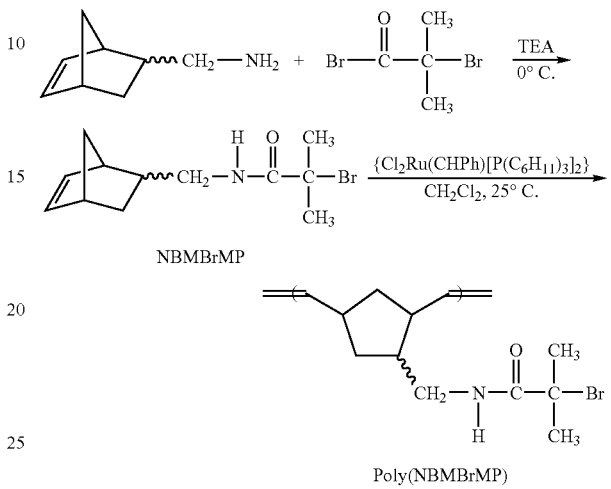

Scheme I.
Synthesis and ring-opening metathesis polymerization of NBMBrMPA

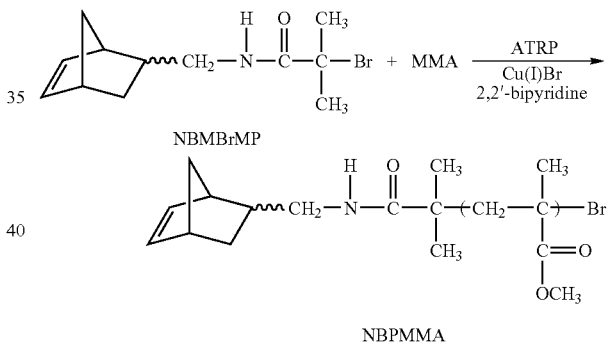

Scheme II. Preparation of macromonomer (NBPMMA)

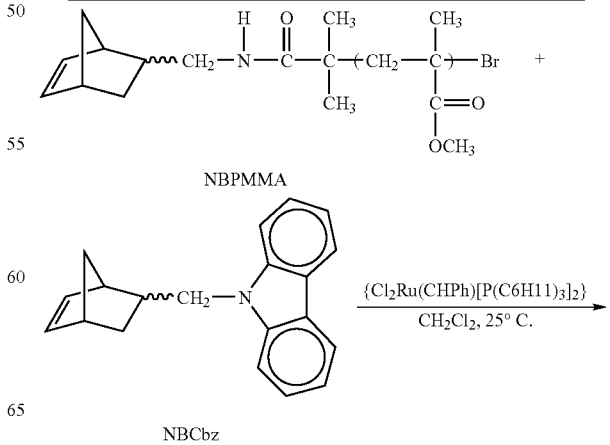

Scheme III. Ring-opening metathesis polymerization of NBCbz and NBPMMA

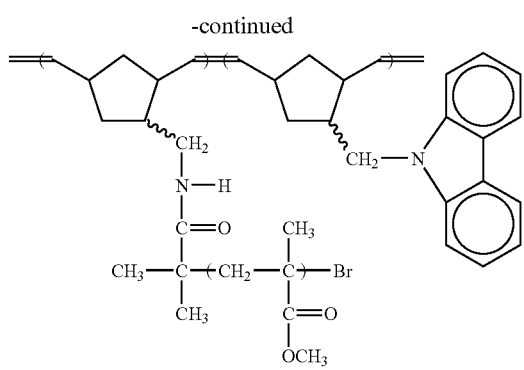

Scheme IV. Synthesis of poly(HNBMBrMPA) and poly(HNBMBrMPA-g-PMMA)

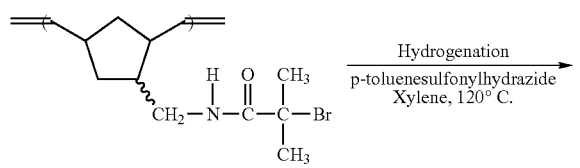

Poly(NBMBrMP)

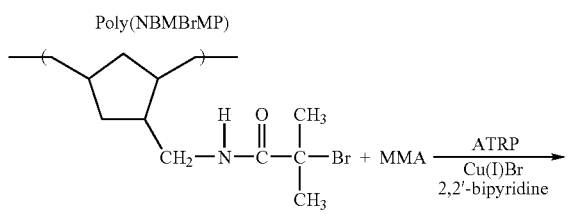

Poly(HNBMBrMP)

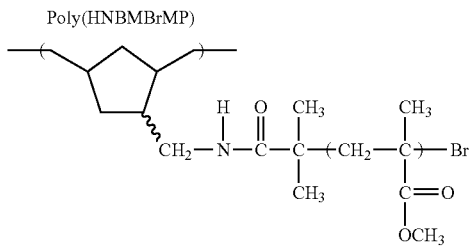

Poly(HNBMBrMP-g-PMMA)

First aspect of the present invention is the synthesis of a novel diblock macroinitiator containing polynorbornene and carbazole segments. The novel diblock macroinitiator containing norborene and carbazole segments is represented by comprising the formula (I):

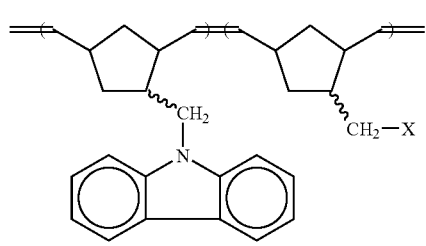

(I)

wherein, X is one selected from a group consisting of Br and Cl. Preferably, said diblock macroinitiator is presented from a mixture of cabazole-containing norbornene-type monomer (II) in the presence of a catalyst via ring-opening metathesis polymerization (ROMP). An additional norbornene derivative (III) was added into the reaction mixture after 15~120 mins of commencing ring-opening metathesis polymerization (ROMP) and said diblock macroinitiator is obtained.

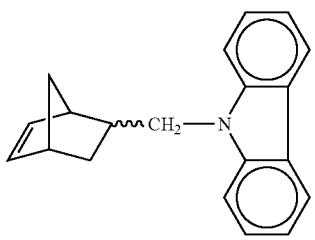

(II)

(III)

wherein, X is one selected from a group consisting of Br and Cl. More preferably, said metathesis catalyst is $\{Cl_2Ru(CHPh)[P(C_6H_{11})_3]_2\}$.

In accordance with second aspect of the present invention, a novel polynorbornene-containing grafted copolymer comprising the formula (IA) is presented. The novel polynorbornene-containing graft copolymer is prepared by using a diblock macroinitiator with the formula (I):

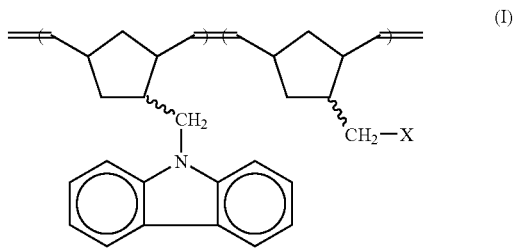

(I)

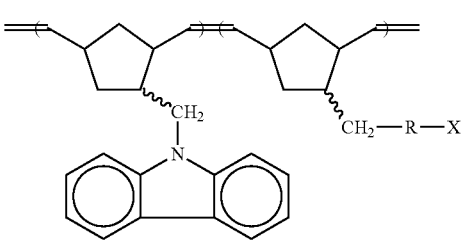

(IA)

wherein, X is one selected from a group consisting of Br and Cl; and

R is one selected from a group consisting of

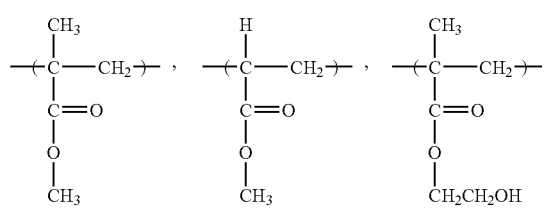

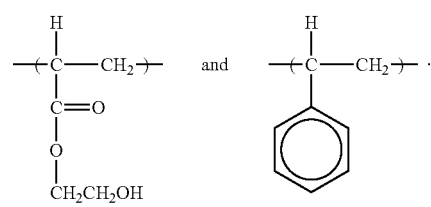

In accordance with third aspect of the present invention is the development of a novel process for preparation of a grafted polynorbornene with the formula (IA). The novel process for preparation of a grafted polynorbornene with the formula (IA) includes the following steps:

a) preparation of a macroinitiator with the formula (I) by means of reaction of cabazole-containing norbornene-type monomer (II) and a catalyst via ring-opening metathesis polymerization and an additional norbornene dervative (III) being added into the mixture after 15~120 mins of commencing ring-opening metathesis polymerization;

b) preparation of a mixture of Cu(I)Br, 2,2'-bipyridine, said macroinitiator (I) and a monomer selected from a group consisting of

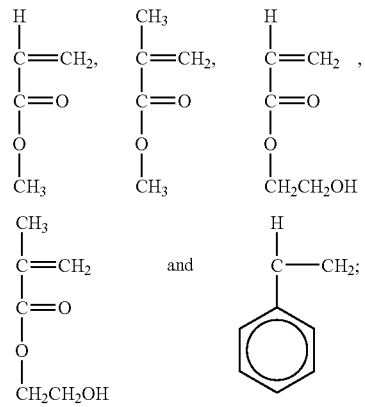

and c) preparation of said grafted polynorbornene copolymer with the formula (IA) by means of a graft copolymerization of said mixture under thermally activated condition and temperatures ranged from 50 to 150° C., wherein,

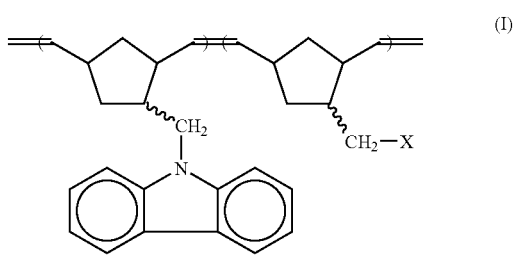

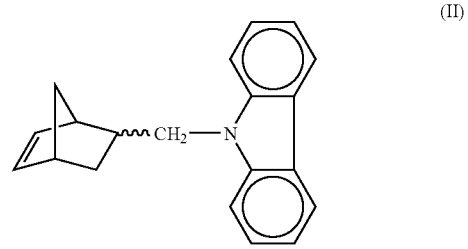

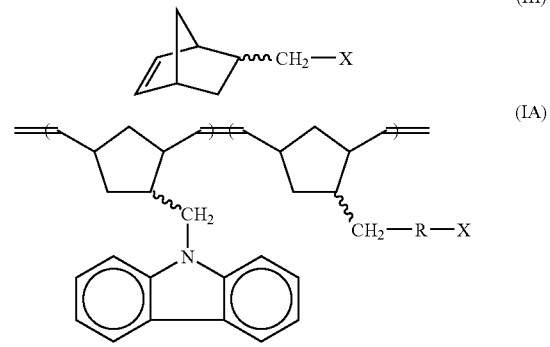

wherein, X is one selected from a group consisting of Br and Cl; and

R is one selected from a group consisting of

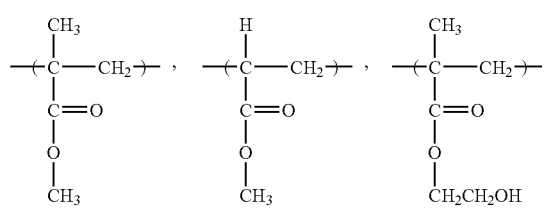

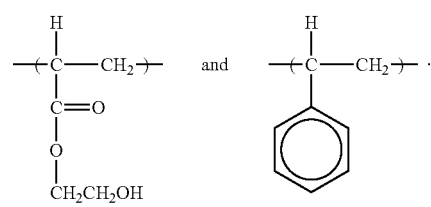

In accordance with fourth aspect of the present invention, the synthesis of a novel thermally-stable saturated cyclic aliphatic diblock macroinitiator comprising the formula (IV) is disclosed. The thermally-stable saturated cyclic aliphatic diblock macroinitiator is prepared by hydrogenating a diblock macroinitiator with the formula (I):

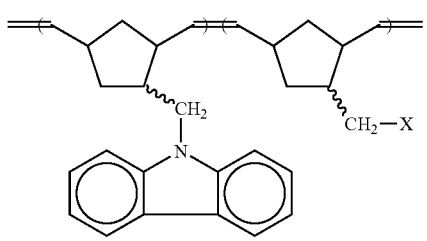
(I)

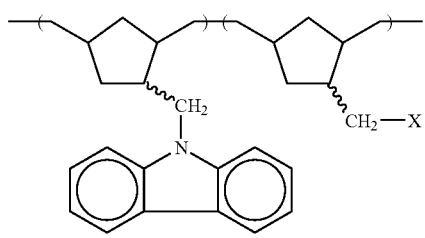
(IV)

wherein, X is one selected from a group consisting of Br and Cl.

In accordance with fifth aspect of the present invention, the synthesis of a novel polynorbornene-containing grafted copolymer comprising the formula (IVA) is disclosed. The polynorbornene-containing grafted copolymer (IVA) is prepared by graft copolymerization of a diblock macroinitiator with the formula (IV):

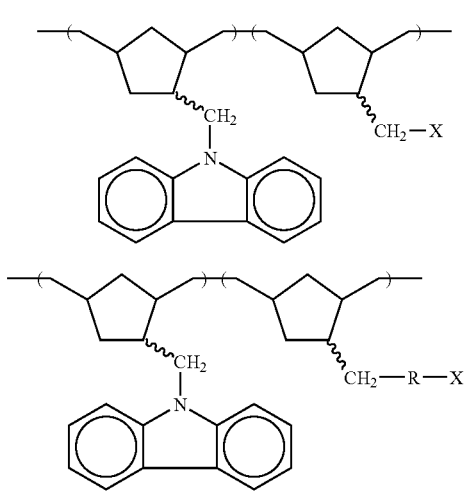
(IV)

(IV A)

wherein, X is one selected from a group consisting of Br and Cl; and

R is one selected from a group consisting of

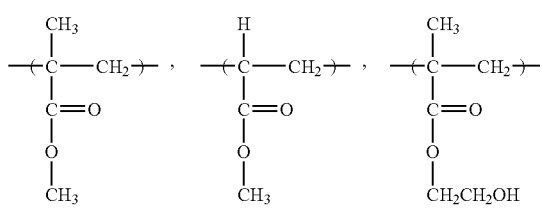

-continued

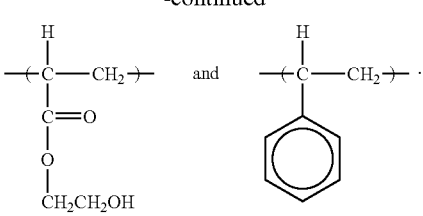
and

In accordance with sixth aspect of the present invention, a novel process for preparing a grafted polynorbornene with the formula (IVA) is disclosed. The process for preparing a grafted polynorbornene (IVA) comprises of following steps:

a) preparation of a macroinitiator with the formula (I) by means of reaction of cabazole-containing norbornene-type monomer (II) and a catalyst via ring-opening metathesis polymerization and addition of additional norbornene dervative (III) into the reaction mixture after 15~120 mins of commencing ring-opening metathesis polymerization b) hydrogenation of said diblock macroinitiator with the formula (I) to prepare a thermaly-stable saturated cyclic aliphatic diblock macroinitiator with the formula (IV);

c) preparation of a mixture of Cu(I)Br, 2,2'-bipyridine, said thermally-stable saturated cyclic aliphatic diblock macroinitiator (IV) and a monomer selected from a group consisting of

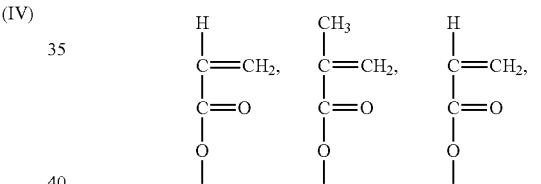

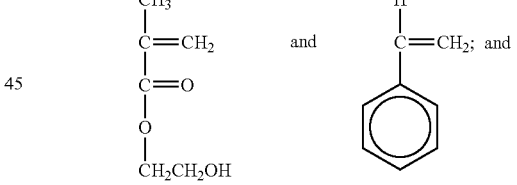
and d) preparation of said grafted polynorbornene copolymer with the formula (IVA) by means of a graft copolymerization of said mixture at various temperatures ranged from 50 to 150° C., wherein,

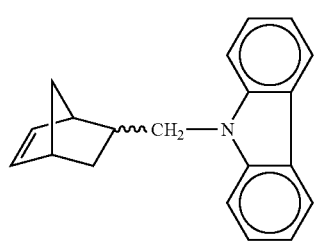
(II)

-continued

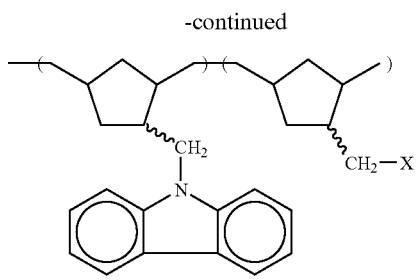
(IV-1)

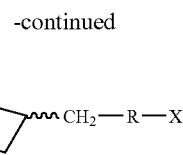
(V)

wherein, X is one selected from a group consisting of Br and Cl; and

R is one selected from a group consisting of

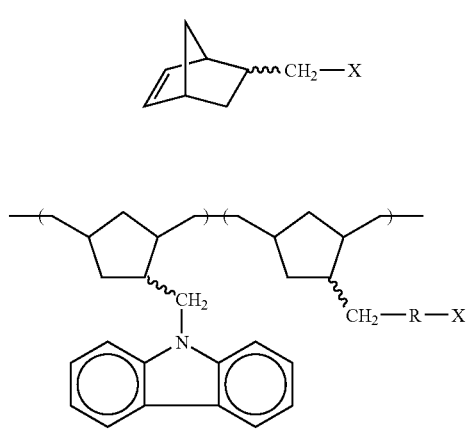
(III)
(IV-1A)

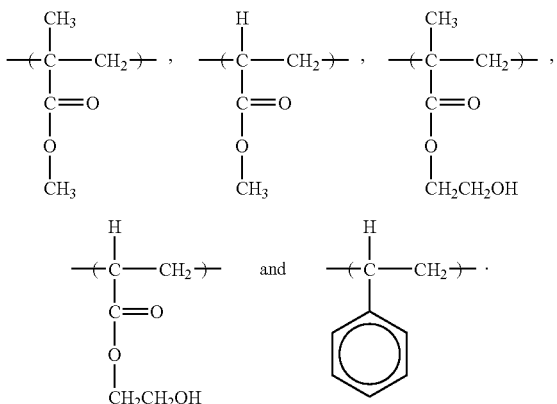

wherein, X is one selected from a group consisting of Br and Cl; and

R is one selected from a group consisting of

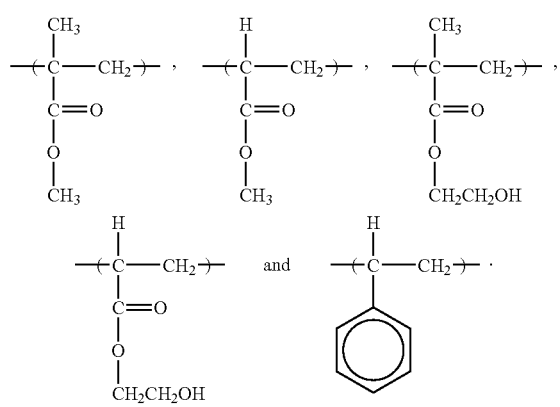

In accordance with seventh aspect of the present invention, the synthesis of a novel norbornene-containing macrmonomer comprising the formula (V) is disclosed. The norbornene-containing macrmonomer (V) is prepared by using a norbornene end group-containing initiator with the formula (III):

In accordance with eighth aspect of the present invention, the synthesis of a novel process for preparing a norbornene end group-containing macrmonomer with the formula (V) is disclosed. The process for preparing a norbornene end group-containing macrmonomer (V) comprises of following steps:

a) preparation of a mixture of Cu(I)Br, 2,2'-bipyridine, a norbornene-type initiator (III) and a monomer selected from a group consisting of

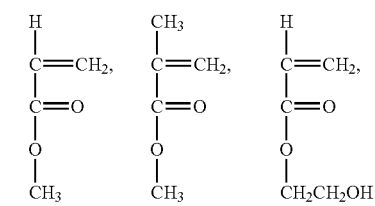

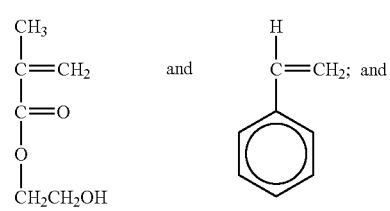

b) preparation of said norbornene end group-containing macrmonomer with the formula (V) by means of radical polymerization of said mixture at various temperatures ranged from 50 to 150° C., wherein,

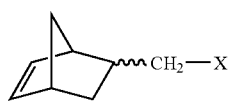
(III)

(III)

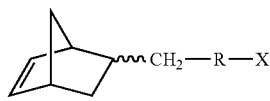
(V)

wherein, X is one selected from a group consisting of Br and Cl; and

R is one selected from a group consisting of

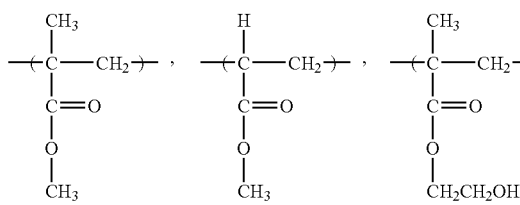

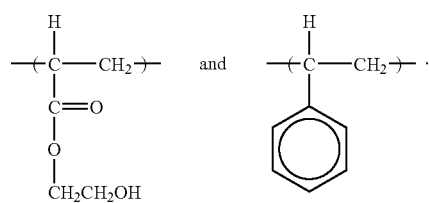

In accordance with ninth aspect of the present invention, the novel process for preparation of norbornene-type macroinitiator comprising the formula (VI) is provided. The norbornene-type macroinitiator (VI) is prepared by ring-opening metathesis polymerization using a catalyst and a norbornene-type dervative with the formula (III):

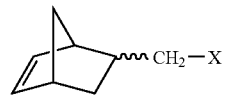
(III)

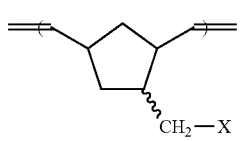
(VI)

wherein, X is one selected from a group consisting of Br and Cl.

In accordance with tenth aspect of the present invention, a novel polynorbornene-containing grafted copolymer comprising the formula (VII) is provided. The polynorbornene-containing grafted copolymer (VII) is prepared by graft copolymerization using a macroinitiator with the formula (VI):

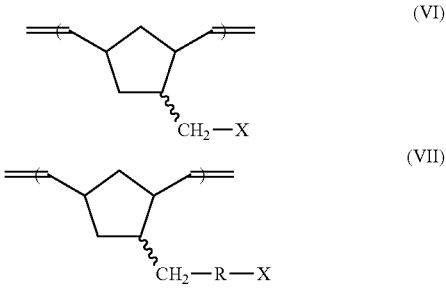
(VI)

(VII)

wherein, X is one selected from a group consisting of Br and Cl; and

R is one selected from a group consisting of

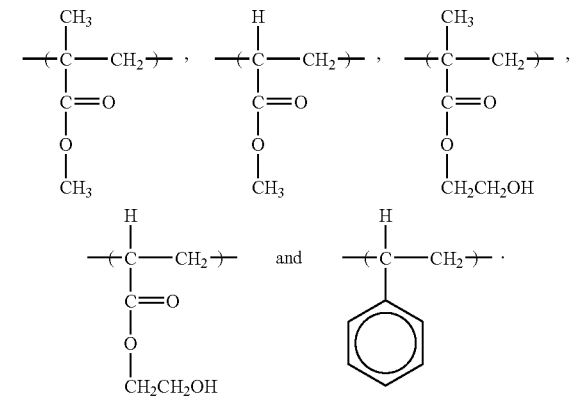

In accordance with eleventh aspect of the present invention, the synthesis of a novel saturated cyclic aliphatic polynorbornene-containing grafted copolymer comprising the formula (IX) is disclosed. The saturated cyclic aliphatic polynorbornene-containing grafted copolymer (IX) is prepared by graft copolymerization using a saturated cyclic aliphatic macroinitiator with the formula (VIII):

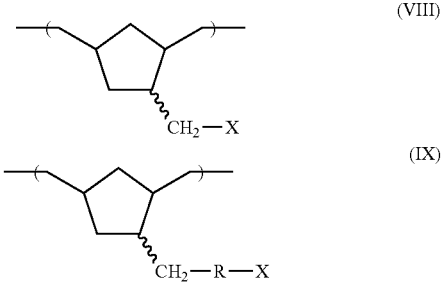
(VIII)

(IX)

wherein, X is one selected from a group consisting of Br and Cl; and

R is one selected from a group consisting of

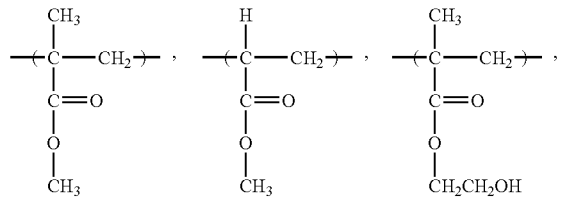

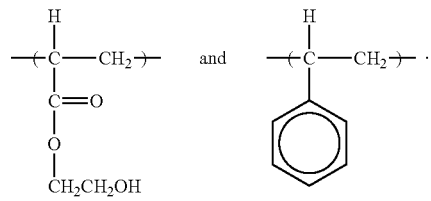

In accordance with twelfth aspect of the present invention, a novel process for preparing grafted polynorbornene copolymer with the formula (VII) is revealed. The process for preparation of grafted polynorbornene copolymer (VII) comprises of following steps:

a) polymerization of a norbornene monomer with the formula (III) by ring-opening metathesis polymerization using a catalyst to obtain a macroinitiator with the formula (VI);

b) preparation of a mixture of Cu(I)Br, 2,2'-bipyridine, said macroinitiator (VI) and a monomer selected from a group consisting of

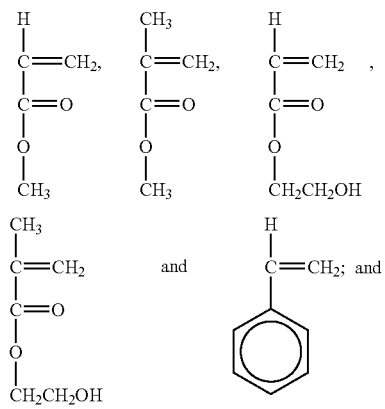

c) preparation of said grafted polynorbornene copolymer with the formula (VII) by means of a graft copolymerization of said mixture at various temperatures ranged from 50 to 150° C., wherein,

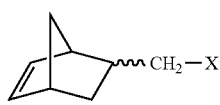

(III)

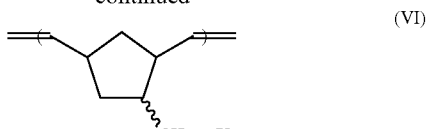

(VI)

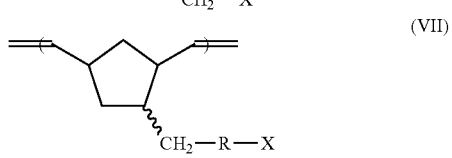

(VII)

wherein, X is one selected from a group consisting of Br and Cl; and

R is one selected from a group consisting of

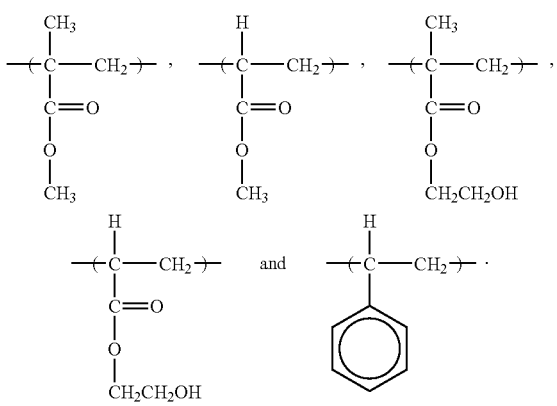

In accordance with thirteenth aspect of the present invention, a novel process for preparing grafted polynorbornene copolymer with the formula (IX) is revealed. The process for preparation of grafted polynorbornene copolymer (IX) comprises of following steps:

a) polymerization of a norbornene monomer with the formula (III) by ring-opening metathesis polymerization using a catalyst to obtain a macroinitiator with the formula (VI);

b) preparation of a mixture of Cu(I)Br, 2,2'-bipyridine, said macroinitiator (VI) and a monomer selected from a group consisting of

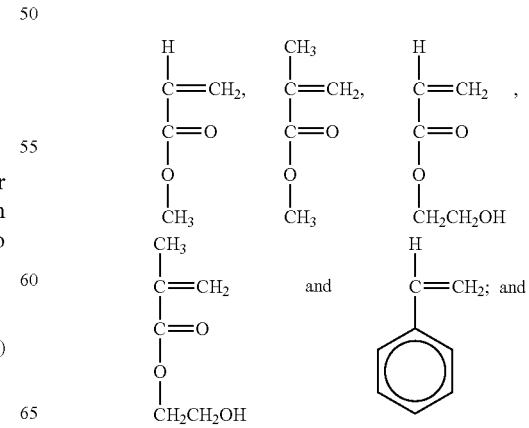

c) hydrogenation of said macroinitiator with the formula (VII) to prepare a thermally-stable saturated cyclic aliphatic macroinitiator with the formula (VIII); and d) preparation of a grafted polynorbornene with the formula (IX) by means of radical polymerization of said mixture at various temperatures ranged from 50 to 150° C., wherein,

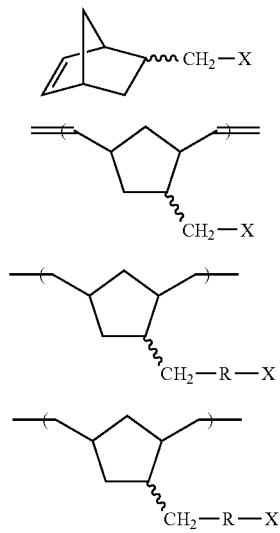

wherein, X is one selected from a group consisting of Br and Cl; and

R is one selected from a group consisting of

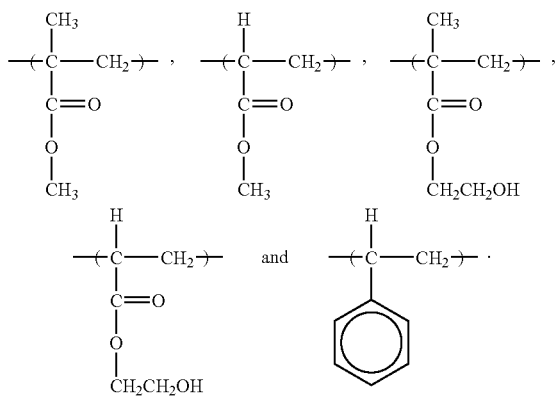

In accordance with fourteenth aspect of the present invention, the synthesis of a novel norbornene-type compound containing bromo-end group is disclosed. The norbornene-type compound containing bromo-end group has the formula (XI):

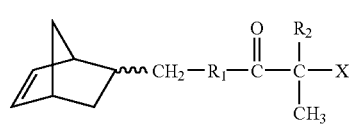

wherein, X is Br or Cl;

$R_1$ is —NH—, —O—, —(CH$_2$)n-NH—, or —(CH$_2$)n-O—, wherein, n denotes an integer of 1 to 4; and $R_2$ is H or —CH$_3$.

In accordance with fourteenth aspect of the present invention, a novel polynorbornene-type macroinitiator containing halogen-side group is disclosed. The polynorbornene-type macroinitiator containing halogen-side group has the formula (XII):

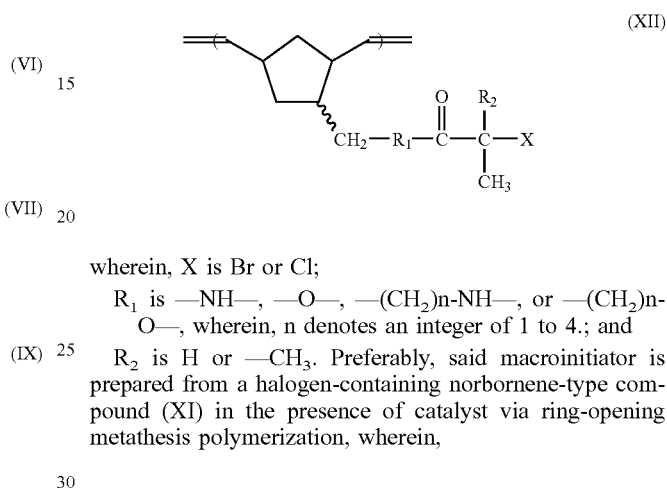

wherein, X is Br or Cl;

$R_1$ is —NH—, —O—, —(CH$_2$)n-NH—, or —(CH$_2$)n-O—, wherein, n denotes an integer of 1 to 4.; and $R_2$ is H or —CH$_3$. Preferably, said macroinitiator is prepared from a halogen-containing norbornene-type compound (XI) in the presence of catalyst via ring-opening metathesis polymerization, wherein,

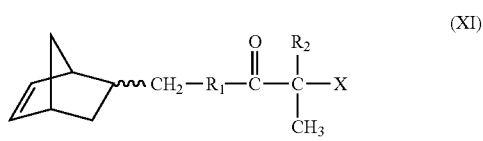

More preferably, said metathesis catalyst is {Cl$_2$Ru(CHPh)[P(C$_6$H$_{11}$)$_3$]$_2$}.

In accordance with fifteenth aspect of the present invention, a novel thermally-stable saturated cyclic aliphatic macroinitiator comprising the formula (XIII) is disclosed. The thermally-stable saturated cyclic aliphatic macroinitiator is prepared by hydrogenating a macroinitiator with the formula (XII):

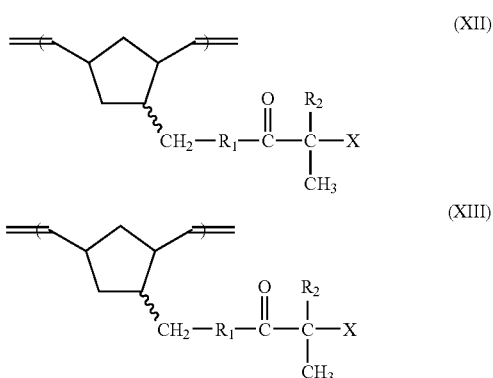

wherein, X is Br or Cl;

$R_1$ is —NH—, —O—, —(CH$_2$)n-NH—, or —(CH$_2$)n-O—, wherein, n denotes an integer of 1 to 4; and $R_2$ is H or —$CH_3$.

In accordance with sixteenth aspect of the present invention, a novel grafted polynorbornene copolymer comprising the formula (XIV) is provided. The grafted polynorbornene copolymer (XIV) is prepared by graft copolymerization using a macroinitiator with the formula (XIII)

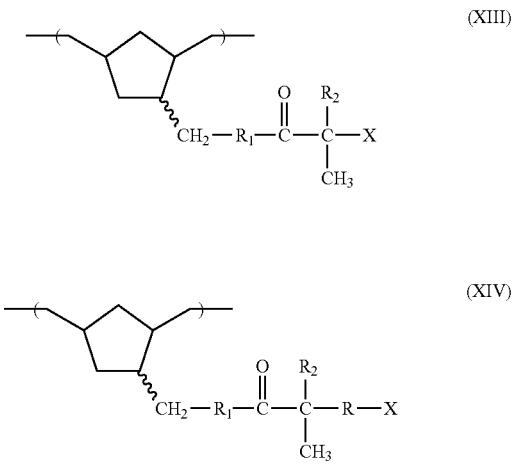

wherein, X is Br or Cl;

$R_1$ is —NH—, —O—, —$(CH_2)$n-NH—, or —$(CH_2)$n-O—, wherein, n denotes an integer of 1 to 4;

$R_2$ is H or —$CH_3$; and

R is one selected from a group consisting of

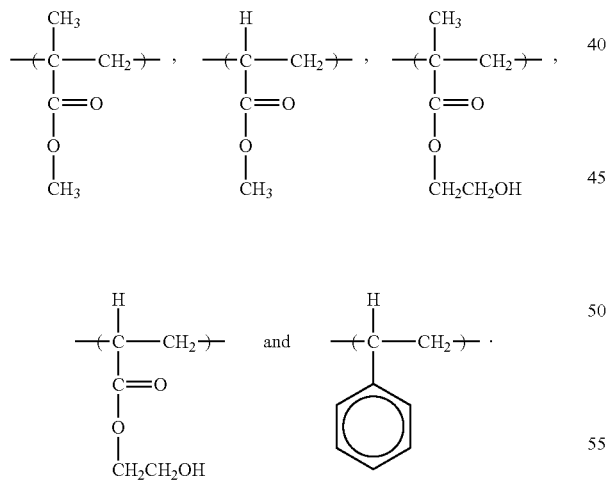

In accordance with seventeenth aspect of the present invention, a novel process for preparing grafted polynorbornene copolymer with the formula (XIV) is provided. The process for preparation of grafted polynorbornene copolymer (XIV) comprises of following steps:

a) polymerization of a norbornene monomer with the formula (XI) by ring-opening metathesis polymerization using a catalyst to obtain a macroinitiator with the formula (XII);

b) hydrogenation of said macroinitiator with the formula (VII) to prepare a thermally-stable saturated cyclic aliphatic macroinitiator with the formula (VIII);

c) preparation of a mixture of Cu(I)Br, 2,2'-bipyridine, said thermally-stable saturated cyclic aliphatic macroinitiator (VIII) and a monomer selected from a group consisting of

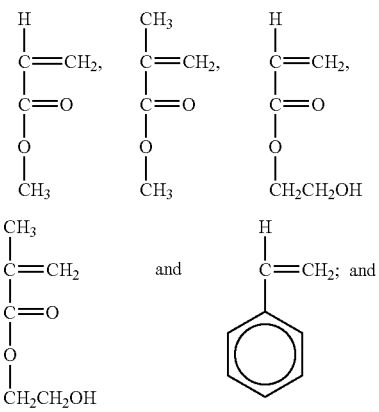

d) preparation of a grafted polynorbornene with the formula (XIV) by means of radical polymerization of said mixture at various temperatures ranged from 50 to 150° C., wherein,

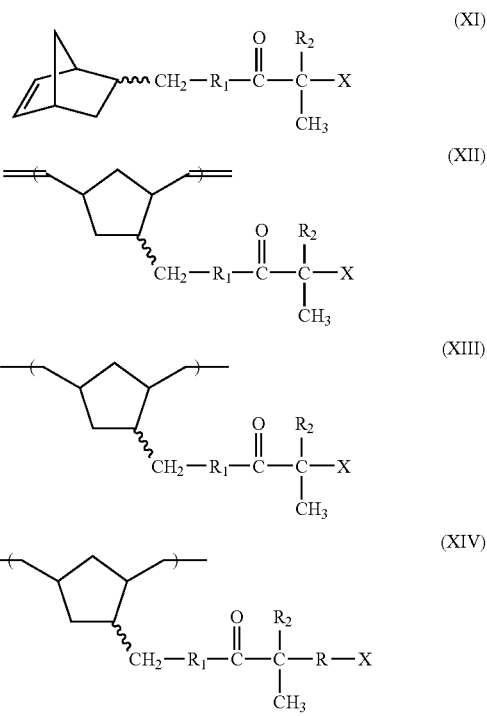

wherein, X is Br or Cl;

$R_1$ is —NH—, —O—, —$(CH_2)$n-NH—, or —$(CH_2)$n-O—, wherein, n denotes an integer of 1 to 4;

$R_2$ is H or —$CH_3$; and

R is one selected from a group consisting of

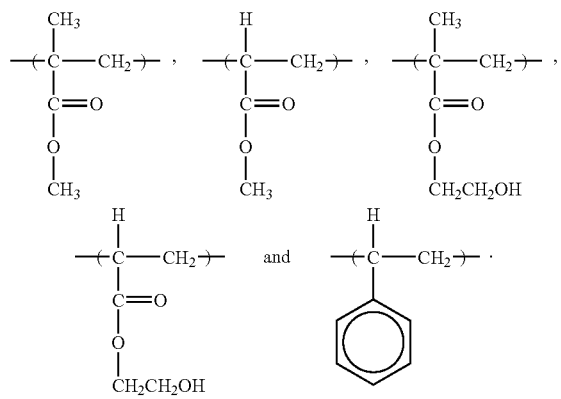

In accordance with eighteenth aspect of the present invention, a novel process for preparing grafted polynorbornene copolymer with the formula (XIVA) is provided. The process for preparation of grafted polynorbornene copolymer comprises of following steps:

a) polymerization of a norbornene monomer with the formula (XI) by ring-opening metathesis polymerization using a catalyst to obtain a macroinitiator with the formula (XII);

b) hydrogenation of said macroinitiator with the formula (XII) to prepare a thermally-stable saturated cyclic aliphatic macroinitiator with the formula (XIII);

c) preparation of a mixture of Cu(I)Br, 2,2'-bipyridine, said thermally-stable saturated cyclic aliphatic macroinitiator (VIII) and a monomer selected from a group consisting of

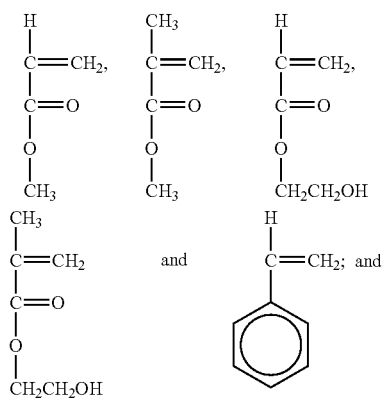

d) preparation of a grafted polynorbornene with the formula (XIVA) by means of radical polymerization of said mixture at various temperatures ranged from 50 to 150° C., wherein,

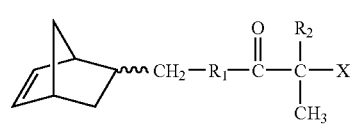

(XI)

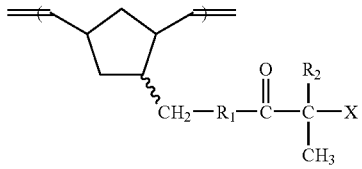

(XII)

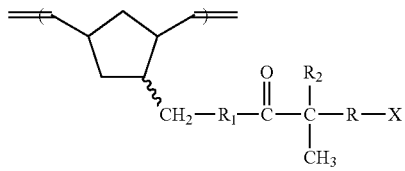

(XIVA)

wherein, X is Br or Cl;

$R_1$ is —NH—, —O—, —$(CH_2)$n-NH—, or —$(CH_2)$n-O—, wherein, n denotes an integer of 1 to 4;

$R_2$ is H or —$CH_3$; and

R is one selected from a group consisting of

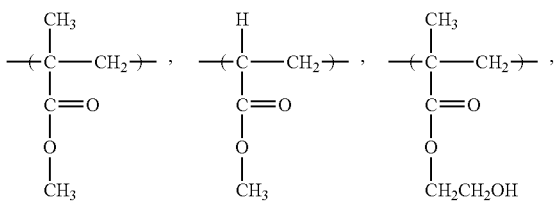

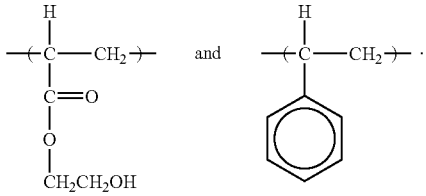

In accordance with nineteenth aspect of the present invention, a novel process for preparing norbornene end group-containing macromonomer with the formula (XV) is provided. The process for preparing norbornene end group-containing macromonomer comprises of following steps:

a) preparation of a mixture of Cu(I)Br, 2,2'-bipyridine, a norbornene derivative (XI) and a monomer selected from a group consisting of

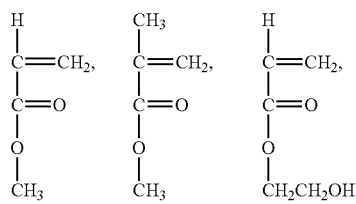

-continued

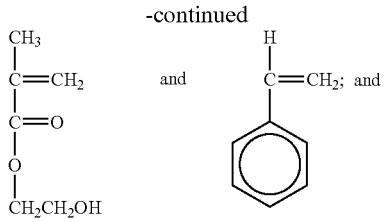

b) preparation of a norbornene end group-containing macromonomer with the formula (XV) by means of radical polymerization of said mixture at various temperatures ranged from 50 to 150° C., wherein,

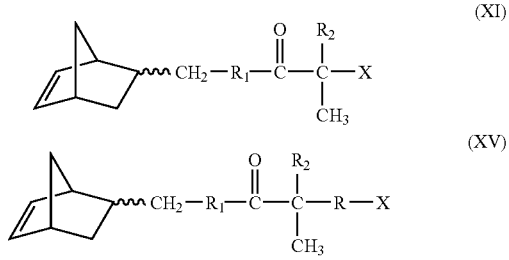

wherein, X is Br or Cl;
$R_1$ is —NH—, —O—, —($CH_2$)n-NH—, or —($CH_2$)n-O—, wherein, n denotes an integer of 1 to 4;
$R_2$ is H or —$CH_3$; and
R is one selected from a group consisting of

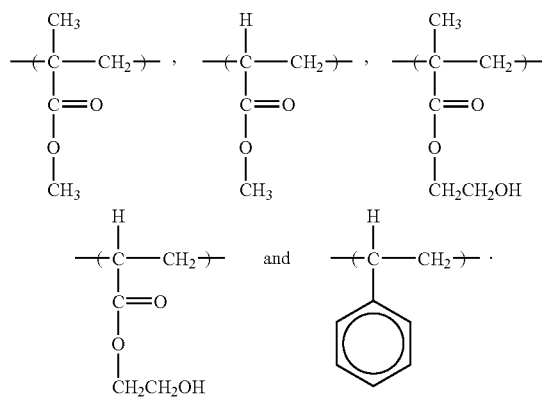

In accordance with twentieth aspect of the present invention, a novel norbornene end group-containing macromonomer is provided. The norbornene end group-containing macromonomer comprises of formula (XV):

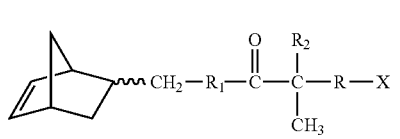

wherein, X is Br or Cl;
$R_1$ is —NH—, —O—, —($CH_2$)n-NH—, or —($CH_2$)n-O—, wherein, n denotes an integer of 1 to 4;
$R_2$ is H or —$CH_3$; and
R is one selected from a group consisting of

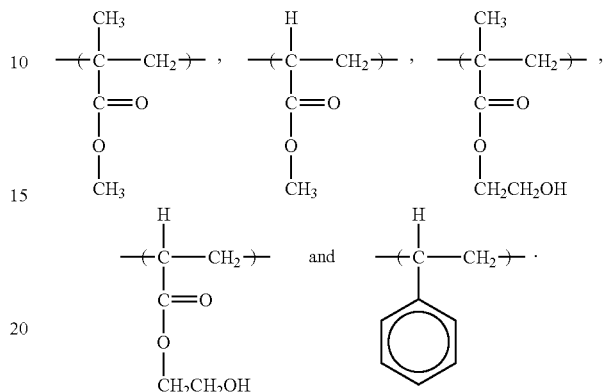

In accordance with twenty first aspect of the present invention, a novel copolymer containing carbazole and halo-side groups is provided. The copolymer containing carbazole and halo-side groups comprises of formula (XVI) is provided:

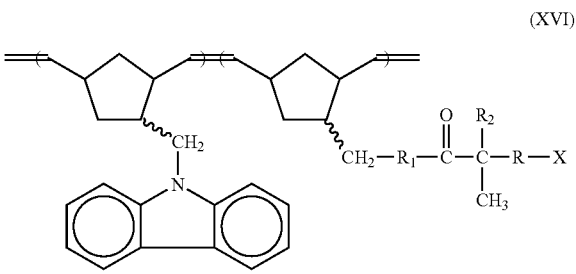

wherein, X is Br or Cl;
$R_1$ is —NH—, —O—, —($CH_2$)n-NH—, or —($CH_2$)n-O—, wherein, n denotes an integer of 1 to 4;
$R_2$ is H or —$CH_3$; and
R is one selected from a group consisting of

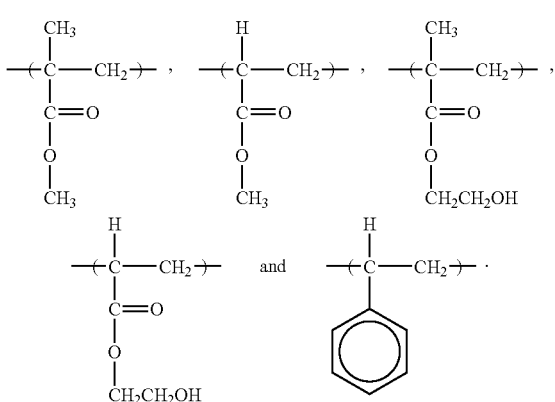

Preferably, said copolymer macroinitiator is prepared from a mixture of cabazole-containing norbornene-type monomer (II) and a macromonomer with the formula (XV) in the presence of catalyst via ring-opening metathesis polymerization, wherein,

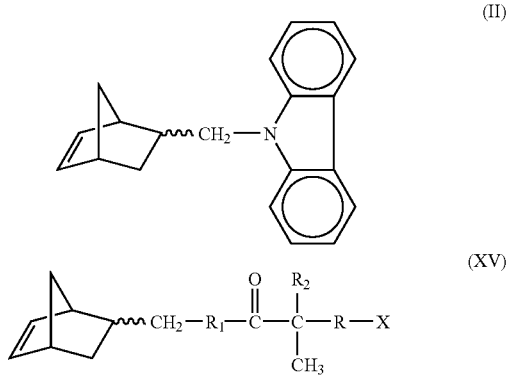

wherein, X is Br or Cl;

$R_1$ is —NH—, —O—, —$(CH_2)$n-NH—, or —$(CH_2)$n-O—, wherein, n denotes an integer of 1 to 4;

$R_2$ is H or —$CH_3$; and

R is one selected from a group consisting of

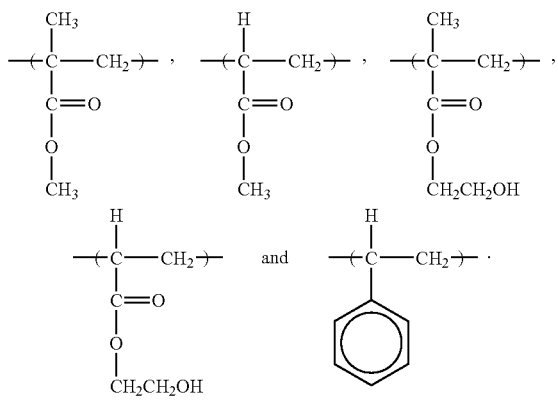

BRIEF DESCRIPTION OF THE DRAWINGS

FIG. 2 and FIG. 2A show TGA curves for (a) a diblock copolymer containing carbazole and bromo groups [poly(NBCbz-b-NBMBr)] and (b) its hydrogenated diblock copolymer [hydrogenated poly(NBCbz-b-NBMBr)] measured under air. Temperature was raised at a rate of 10° C.·$min^{-1}$.

DESCRIPTION OF THE PREFERRED EMBODIMENT

Figure 1A:
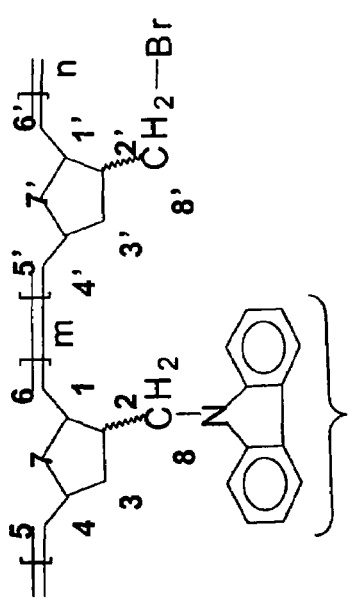
FIG. 1 and FIG. 1A show 400 MHz $^1$H NMR spectrum of diblock copolymer, poly(CbzNB-b-NBMBr), containing carbazole groups and bromo-containing polynorbornene segments ($CDCl_3$).

The present invention discloses a novel norbornene-type monomer as an initiator for radical polymerization, its polymer and a process for producing the same. For example, a series of novel macromonomer, macroinitiator, grafted copolymer, random copolymers and diblock copolymers are disclosed.

First, novel halogen-containing norbornene-type initiators were prepared. Such norbornene-type initiators can be copolymerized with various functional norbornene-type monomer and then the resulting copolymer-type initiators can be used to initiate radical polymerization of methyl methacrylate and styrene for preparation of novel high performance polymeric materials.

According to the present invention, the novel norbornene-type halogen-containing compounds were prepared by Diels-Alder reaction in autoclaves at about 180° C. The Diels-Alder reaction is a reaction of diolefin and olefin monomers for producing cycloolefin derivatives. A series of novel ring-opened polymer, macroinitiator and grafted copolymer can be produced by ring-opening metathesis polymerization of above-mentioned norbornene-type monomer.

The norbornene-type monomers disclosed in the present invention can also be combined with other conventional monomers capable of undergoing ring-opening copolymerization to form novel copolymers, if desirable. Examples of the known norbornene-type monomers are norbornene and alkyl, alkylidene and/or aryl-substituted compounds thereof, such as 5-methyl-2-norbornene, 5,6-dimethyl-2-norbornene, 5-ethyl-2-norbornene, 5-butyl-2-norbornene, 5-ethylidene-2-norbornene, 5-phenyl-2-norbornene; dicyclopentadiene, 2,3-dihydrodicyclopentadiene and substituted compounds of these with alkyl such as methyl, ethyl, propyl, butyl, or the like; dimethanooctahydronaphthalene and alkyl, alkylidene and/or aryl-substituted compound thereof, such as 6-methyl-1, 4:5, 8-dimethanol-1,4,4a,5,6,7,8,8a-octahydronaphthalene, 6-ethyl-1, 4:5, 8-dimethanol-1,4,4a,5,6,7,8,8a-octahydronaphthalene, 6-ethylidene-1, 4:5, 8-dimethanol-1,4,4a,5,6,7,8,8a-octahydronaphthalene, 6-phenyl-1, 4:5, 8-dimethanol-1,4,4a,5,6,7,8,8a-octahydronaphthalene, etc.; trimers and tetramers of cyclopentadiene such as 4, 9:5, 8-dimethano-3a,4,4a,5,8,8a,9,9a-octabydro-1H-benzonindene, 4, 11:5, 10:6, 9-trimethanol-3a,4,4a,5,5a,6,9,9a,10, 10a,11,11a,22a-dodecahydro-1H-cyclopentaanthrace, etc.

In addition, the monomer may have a polar substituent or a substituent having a metal atom. Examples of such a substituent include halogen atoms such as chlorine, bromine and fluorine; ester-type moieties such as methoxycarbonyl, ethoxycarbonyl and acetoxy groups; a cyano group; and a pyridyl group.

Now, the conditions for ring-opening metathesis polymerization are described in detail as follows:

Metathesis Catalyst

Examples of the tungsten and/or molybdenum-based metathesis catalyst are halides, oxyhalides or oxyorganic compounds of these kinds of metal. Specific examples thereof are tungsten hexachloride, tungsten (IV) oxycholride, tungsten tetrachloride, molybdenum pentachloride, acetylacetonatomolybdenum oxide, etc. In the present invention, the used catalyst for ring-opening metathesis polymerization (ROMP) is preferably $\{Cl_2Ru(CHPh)[P(C_6H_{11})_3]_2\}$.

Solvent

The ring-opening polymerization of the norbornene-type monomer in this invention may be carried out in the absence of a solvent. However, it is generally carried out in an inert organic solvent.

As for the organic solvent, hydrocarbon solvents are preferred. Certainly, cyclic hydrocarbon solvents which has excellent power to dissolve the polymers formed by the ring-opening polymerization are particularly preferred.

Specific examples thereof are aromatic hydrocarbons such as benzene, ethylbenzene, toluene, xylene, etc.; aliphatic hydrocarbons such as n-pentane, hexane, heptane, etc.; alicyclic hydrocarbons such as cyclopentane, cyclohexane, methylcyclohexane, dimethylcyclohexane, decalin, etc.; hydrocarbon halides such as methylene dichoride, dichloroethane, dichloroethylene, tetrachloroethane, chlorobenzene, dichlorobenzene, trichlorobenzene, etc., or a combination of these solvents.

The quantity of solvent is based on 1 part by weight of the monomer, usually 1 to 20 parts by weight, preferably 2 to 10 parts by weight.

Polymerization Temperature

The temperature for the ring-opening polymerization are not specially limited, preferably between $-20°$ C. and $100°$ C., more preferably between $0°$ C. and $100°$ C. and most preferably between $10°$ C. and $80°$ C.

Pressure for Polymerization System

The pressure for the polymerization ranges from 0 to 50 $kg/cm^2$, preferably from ambient pressure to 10 $kg/cm^2$ and more preferably not more than 5 $kg/cm^2$.

Atmosphere for Polymerization System

The ring-opening polymerization is usually carried out in the presence of an inert gas such as nitrogen, argon, or the like.

EXAMPLES

The present invention will be described further in detail below with reference to examples. However, this invention shall not be limited thereto.

Novel bromo end group-containing norbornene-type monomer can be polymerized by ring-opening metathesis polymerization (ROMP) to obtain novel polymeric materials. Selectively, the bromo end group-containing norbornene-type monomer can be used as an initiator to prepare various functional polymeric materials by polymerization of vinyl group-containing monomers.

EXAMPLES

The present invention will be described further in detail below with reference to/examples. However, this invention shall not be limited thereto.

Example 1

Preparation of Halogen-Containing Functional Norbornene

The synthesis of (2-chloro methyl)bicyclo[2,2,1]hept-2-ene (norbornene methylene chloride; NBMCl) (bp=54~56° C./11 mmHg) and (2-bromo methyl)bicyclo[2,2,1]hept-2-ene (norbornene methylene bromide; NBMBr) (bp=75~78° C./13 mmHg) was accomplished via the Diels-Alder condensation of freshly cracked dicyclopentadiene and the corresponding allyl chloride and allyl bromide, respectively.

Preparation of halogen-containing functional norbornenes (NBMCl and/or NBMBr) is shown in the following scheme:

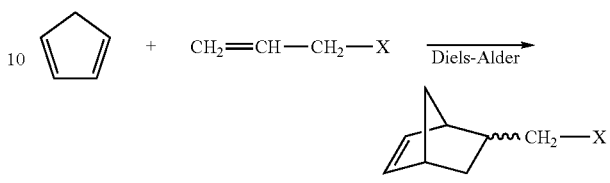

wherein, X is Br or Cl.

Example 2

Preparation of Carbazole-Containing Norbornene-Type Monomer 12 g of potassium hydroxide (KOH) and 30 g of carbazole was added into 200 ml of xylene. A potassium carbazole salt can be produced by removing the water as a azeotrope by boiling with xylene from the above solution. Then, the xylene is removed from the above solution and replaced by DMF to act as a solvent. 25 g of 5-chlormethyl-2-norbornene is added to the above solution, followed by refluxing for about 12 hours. After 12 hours, the resulting solution is added to 200 ml of water and the mixture is extracted with 100 ml of ethyl acetate three times. After removing the ethyl acetate from the mixture by distillation, the residue obtained was purified by silica gel column chromatography using a mixture of solvent containing ethyl acetate and n-hexane (ethyl acetate and n-hexane=1:6) as eluant. Then, the carbazole-containing norbornene-type compound (the ratio of endo isomer:exo isomer is 3:2) which has a melting point of about 74–76° C. was purified by recrystallization using hexane as solvent. The carbazole-containing norbornene-type monomer has the formula (i).

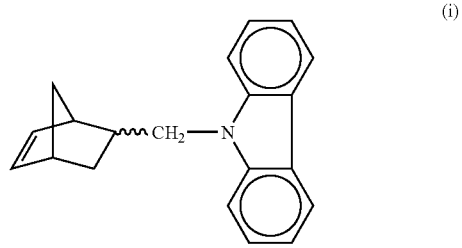

$^{13}$C-NMR analysis (CDCl$_3$)δ(ppm): 140.4, 138.3, 136.5, 136.1, 132.4, 125.5, 122.7, 120.1, 118.6, 108.8, 50.0, 48.1, 47.0, 45.0, 44.5, 44.0, 42.6, 41.8, 39.0, 38.6, 30.8, 30.5. IR spectrum analysis (KBr PELLET. cm$^{-1}$): 1587($v_{C=C}$, vinylic), 1647, 1478($v_{C=C}$, aromatic stretching), 1324($v_{C-N}$), 745, 718($v_{C-H}$, carbazole ring out of plane). UV spectrum analysis (THF): λmax=236.2 nm, $\epsilon$=4.19×10$^4$ Lmole$^{-1}$ cm$^{-1}$. Elemental analysis (C$_{20}$H$_{19}$N): Calculated. C, 87.87%; H, 7.01%; N, 5.12%. Found. C, 87.58%; H, 7.08%; N, 5.31%.

Example 3

Preparation of Carbazole-Containing Diblock Macroinitiator Having Various Segment Lengths Via Romp Using {RuCl₂(CHPh)[P(C₆H₁₁)₃]₂} as a Catalyst The monomer, CbzNB, can be polymerized by living ROMP. New macroinitiator, poly(CbzNB-b-NBMBr), for radical polymerization was synthesized by ROMP. A solution of catalyst was prepared by dissolving {RuCl₂(CHPh)[P(C₆H₁₁)₃]₂} ($1.22 \times 10^{-2}$ mmol) in 1 mL of anhydrous methylene chloride in an argon-filled drybox. The monomer CbzNB ($9.8 \times 10^{-3}$ mol) was dissolved in 4 mL of methylene chloride and then degassed via a freeze-pump-thaw cycle. After complete degassing, the catalyst solution was injected into the monomer solution by a syringe. The pink solution was vigorously stirred at 30° C. for 20 min. NBMBr ($1.22 \times 10^{-3}$ mol) was injected to the still-living reaction mixture and the solution was stirred for another 12 hrs at 30° C. The color of the solution changed from pink to yellow after addition of NBMBr. The polymerization was terminated by the addition of a small amount of ethyl vinyl ether (0.5 mL). After termination, the solution was stirred for an additional 5 min and poly(CbzNB-b-NBMBr) was precipitated in excess of methanol and dried overnight in a vacuum system at room temperature to give a flaky white solid.

Figure 1:
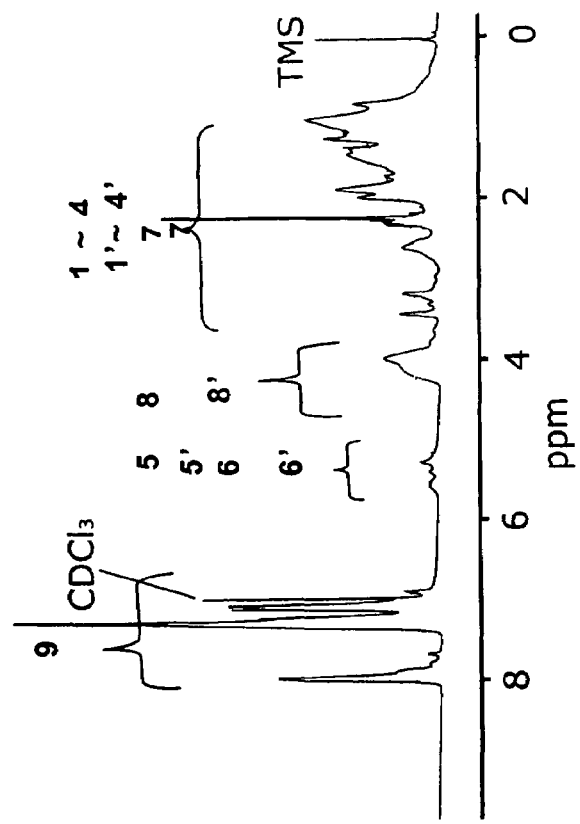

In the ¹H NMR spectrum of poly(CbzNB-b-NBMBr) (FIG. 1 and FIG. 1A), signals due to the vinylic proton peaks of norbornene ring of NBMBr or CbzNB at about 5.90 and 6.00 ppm disappeared and the polymer has shown new vinyl protons as broad signals between 5.10 and 5.80 ppm. Before hydrogenation, the resonance signals between 5.10 and 5.80 ppm for polynorbornene main chains and the aromatic resonances between 6.80 and 8.10 ppm for CbzNB are observed.

Figure 2:
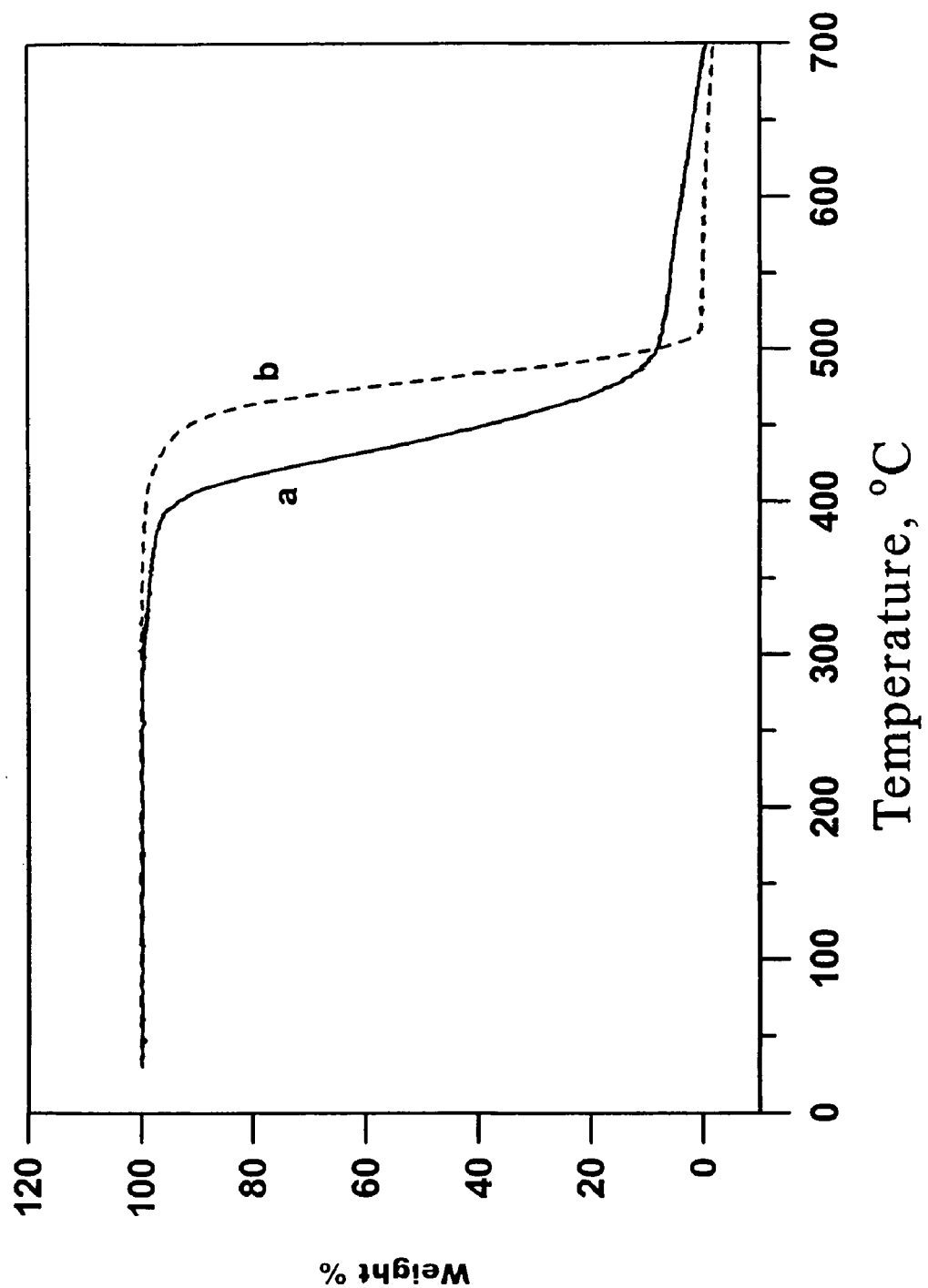

Thermogravimetric analysis (TGA): The polymer was fairly stable up to a temperature around or above 300° C. as shown in FIG. 2.

Fluorescence emission: Poly(CbzNB-b-NBMBr) exhibited a strong carbazole fluorescence, with monomer emission occurring in the near-UV at approximately 380 nm and extending into the blue-violet region (330 nm excitation). A low-level emission observed at higher wavelengths (480 nm) was probably due to excimer formation.

Preparation of poly(CbzNB-b-NBMBr) is shown in the following scheme:

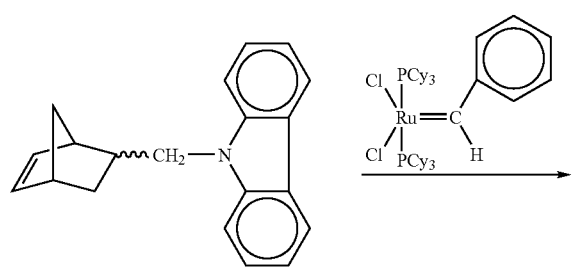

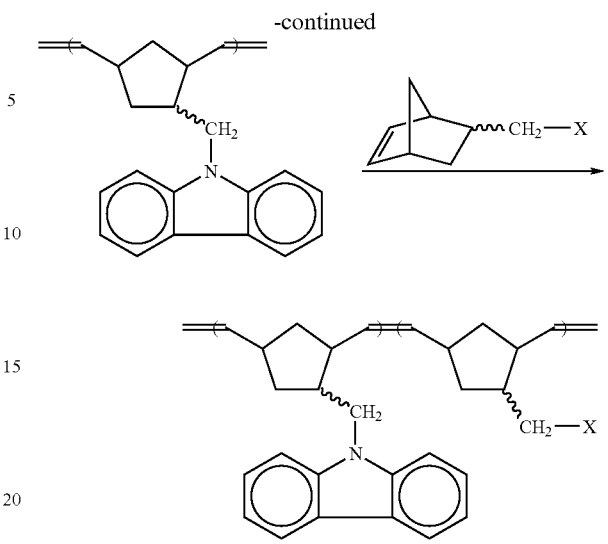

Example 4

Hydrogenation of the Carbazole-Containing Macroinitiator

Poly(CbzNB-b-NBMX, X=Br or Cl) [Poly(CbzNB-b-NBMBr) or Poly(CbzNB-b-NBMCl)] (0.2 g) was dissolved in 20 mL of xylene in an ampoule. To the above solution, 1.0 g of p-toluenesulfonylhydrazide as a hydrogenation agent and a trace of 2,6-di-tert-butyl-4-methylphenol were added. The ampoule containing the macroinitiator [Poly(CbzNB-b-NBMBr) or Poly(CbzNB-b-NBMCl)], solvent and hydrogenation agent was then degassed thrice via a freeze-pump-thaw cycle and sealed. The ampoule was gradually heated to 120° C. A homogeneous solution resulted at 100° C. The solution was stirred at 120° C. for 3 hrs until the generation of gas bubbles ceased. The solution was cooled to room temperature and precipitated from methanol. The macroinitiator [Hydrogenated Poly(CbzNB-b-NBMBr) or Hydrogenated Poly(CbzNB-b-NBMCl)] was purified by reprecipitation from methanol. Hydrogenated macroinitiator [Hydrogenated poly(CbzNB-b-NBMBr) or Hydrogenated Poly(CbzNB-b-NBMCl)] [Poly(HCbzNB-b-HNBMBr) or Poly(HCbzNB-b-HNBMCl)] was dried by freeze-drying.

In the ¹H NMR spectrum of hydrogenated poly(CbzNB-b-HNBMBr), the resonances between 5.10 and 5.80 ppm due to protons of the double bond of polynorbornene main chain are disappeared and the aromatic resonances between 6.80 and 8.10 ppm for CbzNB are appeared. The resonances between 0.50 and 4.50 ppm for aliphatic polynorbornene main chain are observed.

Thermogravimetric analysis (TGA): The polymer was fairly stable up to a temperature around or above 420° C. as shown in FIG. 2(b).

Fluorescence emission: Hydrogenated poly(CbzNB-b-NBMBr)[poly(HCbzNB-b-HNBMBr)] exhibited a strong carbazole fluorescence, with monomer emission occurring in the near-UV at approximately 380 nm and extending into the blue-violet region (330 nm excitation). A low-level emission observed at higher wavelengths (480 nm) was probably due to excimer formation.

Hydrogenation of these carbazole-containing macroinitiators is shown in the following scheme:

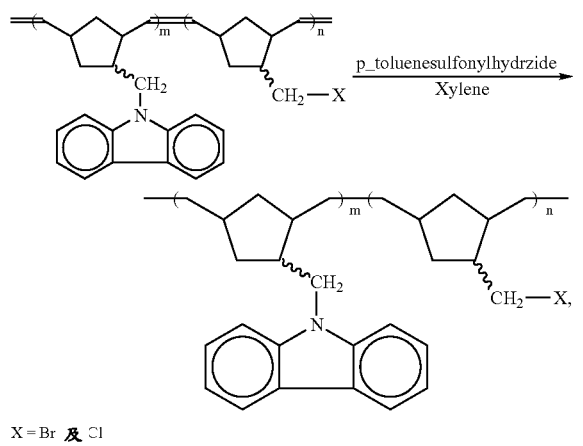

X = Br & Cl

Example 5

Preparation of Macromonomers with Norbornene End Group

Functional norbornenes containing halo end group in present invention are employed to be initiators in order to prepare poly(methyl methacrylate) and poly(styrene) via radical polymerization of methyl methacrylate and styrene, respectively.

The structures of norbornene-containing macromonomers are shown in the following scheme:

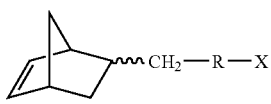

wherein, X is Br or Cl; and

R is poly(methyl methacrylate) or poly(styrene).

Example 6

Preparation of Poly(MMA) with Norbornene Methylene End Group, NBMPMMA

To an ampoule, Cu(I)Br (1 mmol), 2,2'-bipyridine (1 mmol), norbornene methylene bromide (NBMBr) (1 mmol), methyl methacrylate (MMA) (100 mmol) and toluene (10 mL) were added. The heterogeneous mixture was placed under vacuum and then degassed via a freeze-pump-thaw cycle thrice. After degassing, the reaction mixture in ampoule was stirred at 130° C. for 12 hrs. The polymer was precipitated from methanol and reprecipitated into methanol three times. A new macromonomer of α-norbornene methylene poly(methyl methacrylate) (NBMPMMA) was obtained. $\overline{Mn}=1.80\times10^5$ and PDI=1.3 by GPC (n=1800).

Preparation of norbornene-containing macromonomer with bromo end group is shown in the following scheme:

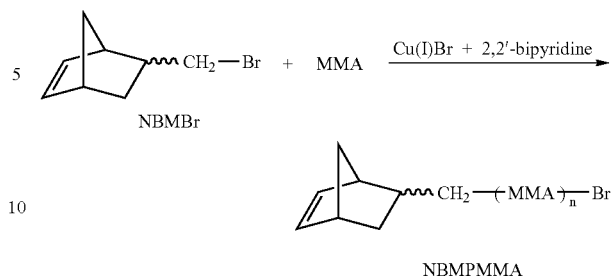

Also, Cu(I)Br (1 mmol), 2,2'-bipyridine (1 mmol), norbornene methylene chloride (NBMCl) (1 mmol), methyl methacrylate (100 mmol) and toluene (10 mL) were used for preparation of choro-containing macromonomer as following:

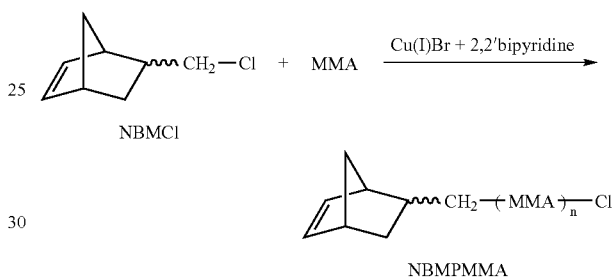

Example 7

Preparation of Poly(Styrene) with Norbornene Methylene End Group, NBMPSt

To an ampoule, Cu(I)Br (0.38 g), 2,2'-bipyridine (1.25 g), norbornene methylene bromide (NBMBr)(0.5 g), styrene (8 g) and toluene (10 mL) were added. The heterogeneous mixture was placed under vacuum and then degassed via a freeze-pump-thaw cycle thrice. After degassing, the reaction mixture in ampoule was stirred at 130° C. for 12 hrs. The polymer was precipitated from methanol and reprecipitated from THF into methanol three times. A new macromonomer of α-norbornene methylene polystyrene (NBMPSt) was obtained. $\overline{Mn}=1.60\times10^5$ and PDI=1.26 by GPC.

Thermal property: NBMPSt macromonomer ($\overline{Mn}=1.60\times10^5$) had a Tg of 107° C. (By DSC) for polystyrene segment.

Figure 3A:
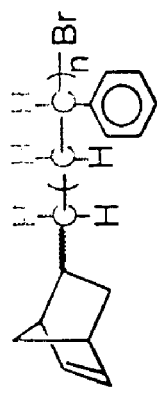
FIG. 3 and FIG. 3A show 400 MHz $^1$H NMR spectrum obtained in $CDCl_3$ at 25° C. for a macromonomer containing norbornene end group (NBMPStBr).
Figure 3:
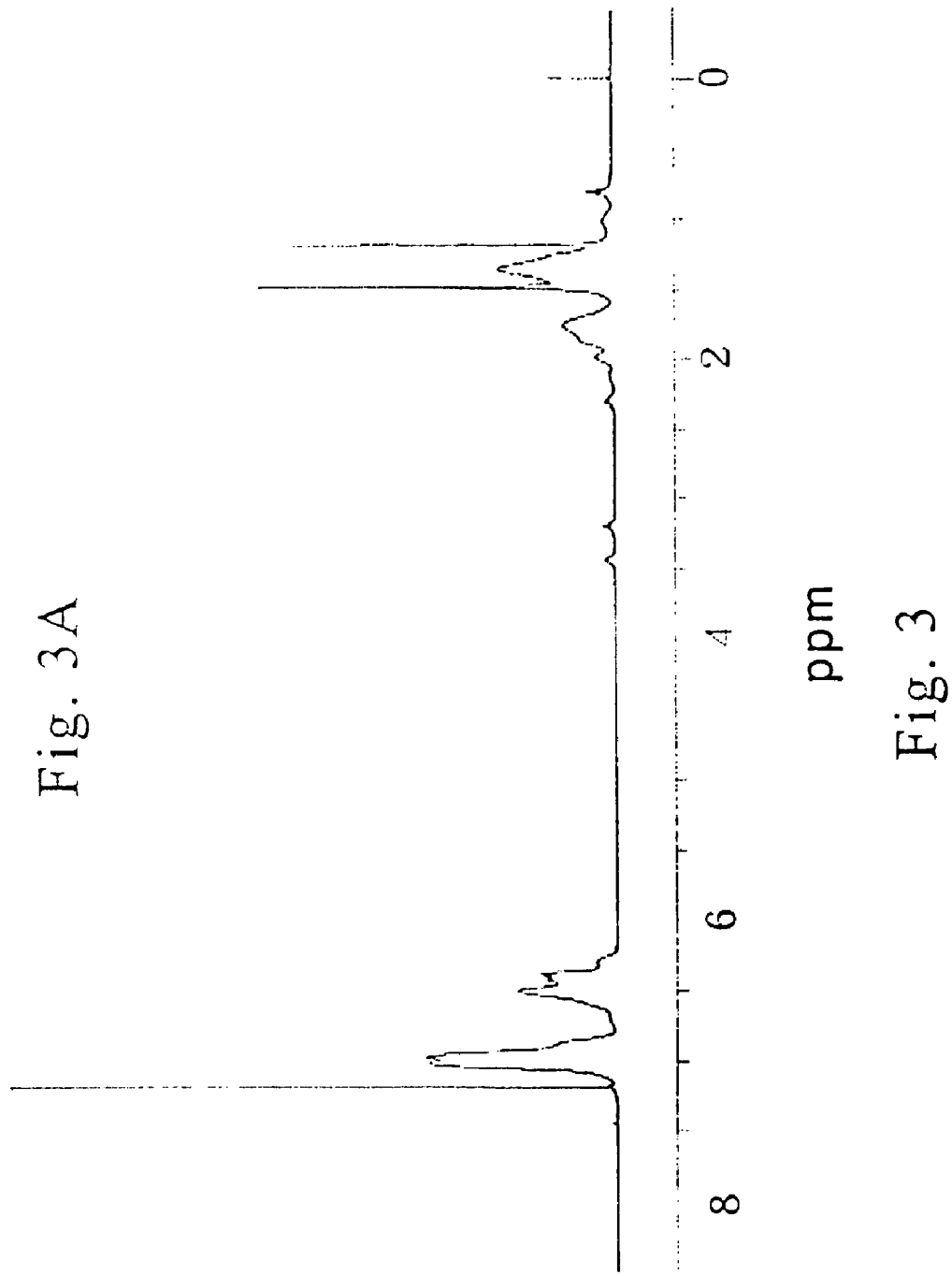

400 MHz $^1$H NMR spectrum obtained in CDCl$_3$ at 25° C. for NBMPSt macromonomer was shown in FIG. 3.

Preparation of NBMPSt macromonomer is shown as following scheme:

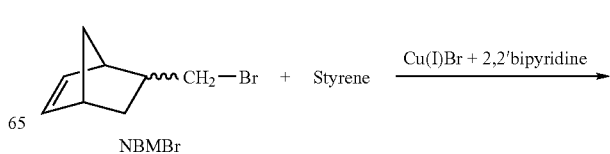

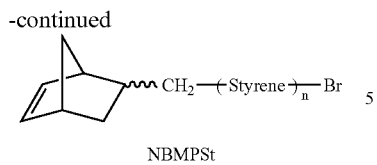

NBMPSt

Example 8

Preparation of Halogen-Containing Polynorbornene

NBMBr (2.5 mmol) was dissolved in 4 mL of methylene chloride ($CH_2Cl_2$). After degassing by freeze-pump-thaw cycle, the solution of $\{RuCl_2(CHPh)[P(C_{18}H_{15})]_2\}$ ($2.5 \times 10^{-3}$ mmol) in 1 mL of methylene chloride was injected to the monomer solution. The solution was stirred for 2 hrs at 30° C. The reaction was terminated by the addition of a trace amount of ethyl vinyl ether (0.1 mL). The solution was continuously stirred for another 10 min and then the polymer was precipitated in excess of methanol. Poly(NBMBr) was obtained. NBMBr can be polymerized by ring-opening metathesis polymerization (ROMP) even containing functional bromo-end group of monomer. The high functional group tolerance of $\{RuCl_2(CHPh)[P(C_{18}H_{15})]_2\}$ has prompted an investigation of the use it as ring-opening metathesis polymerization (ROMP) catalyst in the formation of macroinitiators for radical polymerization.

The structure is shown in the following scheme:

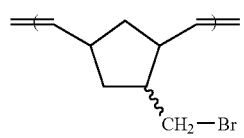

wherein, X is Br or Cl.

Example 9

Preparation of a Grafted Copolymer with PMMA Derived from the Bromo-Containing Macroinitiator Via Radical Polymerization To an ampoule, Cu(I)Br (1 mmol), 2,2'-bipyridine (1 mmol), poly(NBMBr), (1 mmol) and methyl methacrylate (MMA) (100 mmol) were added in 10 mL toluene. The heterogeneous mixture was placed under vacuum and then degassed via a freeze-pump-thaw cycle thrice. After degassing, the reaction mixture in ampoule was stirred at 100° C. for 12 hrs. The polymer was precipitated from methanol; dissolved in THF and reprecipitated from methanol three times.

Graft copolymerization of bromo-containing macroinitiator [poly(NBMBr)] with methyl methacrylate (MMA) in toluene solution is shown in the following scheme:

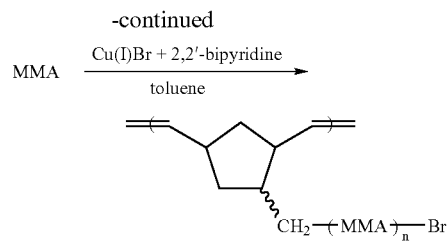

Bulk graft copolymerization of bromo-containing macroinitiator poly(NBMBr) is shown in the following scheme

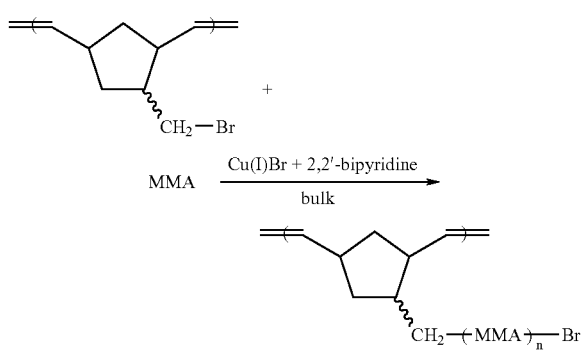

The reaction of poly(NBMCl) with Cu(I)Br and 2,2'-bipyridine in toluene is shown in the following scheme:

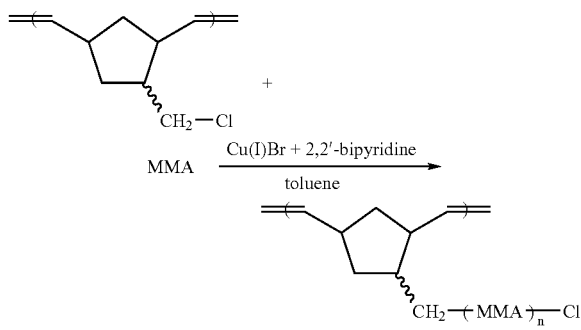

Bulk graft copolymerization of chloro-containing macroinitiator poly(NBMCl) is shown in the following scheme:

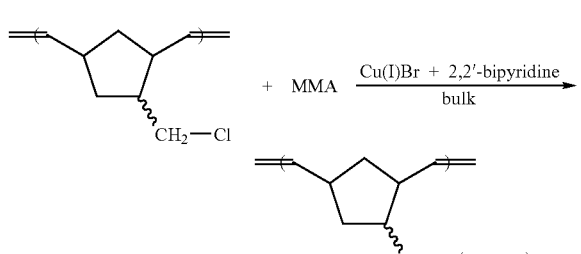

Example 10

Hydrogenation of Functional Polynorbornenes Containing Halo Side Group, poly{(2-bromo methyl)bicyclo[2,2,1]hept-2-ene}[poly(NBMBr)] or poly{(2-chloro methyl)bicyclo[2,2,1]hept-2-ene}[poly(NBMCl)]

A functional polynorbornene containing halo side group, poly{(2-bromo methyl)bicyclo[2,2,1]hept-2-ene}[poly(NBMBr)] or poly{(2-chloro methyl)bicyclo[2,2,1]hept-2-ene}[poly(NBMCl)], (0.5 g) was dissolved in 50 mL of xylene in an ampoule. To the above solution, 2.75 g (7.5 equiv. relative to the repeating unit) of p-toluenesulfonylhydrazide as a hydrogenation agent and a trace of 2,6-di-tert-butyl-4-methylphenol were added. The ampoule containing the polymer, solvent and hydrogenation agent was then degassed thrice via a freeze-pump-thaw cycle and sealed. Then, it was gradually heated to 120° C. A homogeneous solution resulted at 100° C. The solution was stirred at 120° C. for 3 hr until the generation of gas bubbles ceased. The solution was cooled to room temperature and precipitated in methanol. The polymer was purified by reprecipitation in methanol. The hydrogenated polymer, hydrogenated poly(NBMBr) or hydrogenated poly(NBMCl), was dried under vacuum overnight at room temperature.

The synthetic scheme is shown as the following:

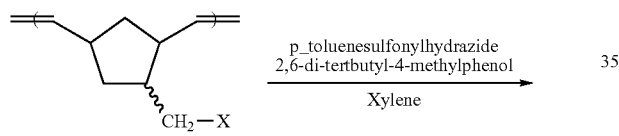

wherein, X is Br or Cl.

Example 11

Preparation of a Grafted Copolymer with PMMA Using the Hydrogenated Bromo-Containing Macroinitiator [Hydrogenated Poly(NBMBr) or Hydrogenated Poly(NBMCl)] via ATRP To an ampoule, Cu(I)Br (1 mmol), 2,2'-bipyridine (1 mmol), poly(NBMBr), (1 mmol) and methyl methacrylate (MMA) (100 mmol) were added in 10 mL toluene. The heterogeneous mixture was placed under vacuum and then degassed via a freeze-pump-thaw cycle thrice. After degassing, the reaction mixture in ampoule was stirred at 100° C. for 12 hrs. The polymer was precipitated from toluene into methanol; dissolved in THF and reprecipitated from methanol three times.

The reaction in toluene is shown in the following scheme:

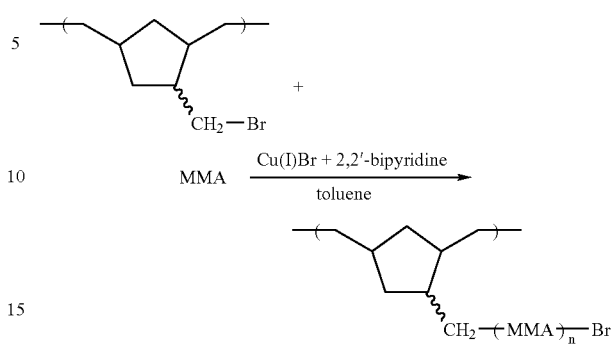

The bulk polymerization is shown in the following scheme:

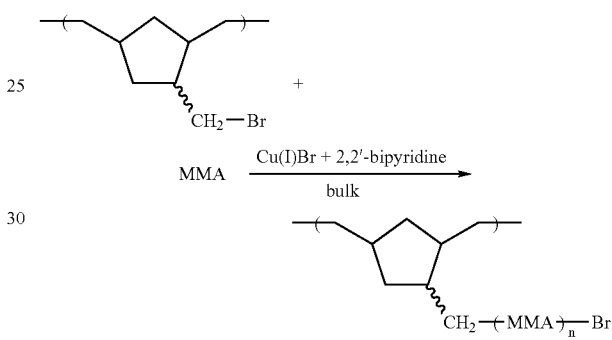

The reaction of norbornene chloride with Cu(I)Br and 2,2'-bipyridine in toluene is shown in the following scheme:

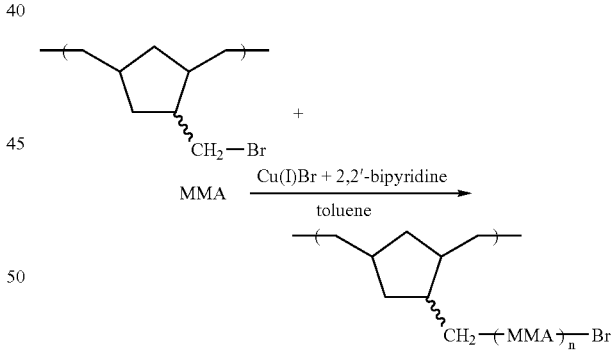

The bulk reaction of norbornene chloride with Cu(I)Br and 2,2'-bipyridine is shown in the following scheme:

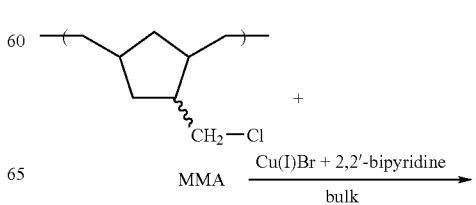

-continued

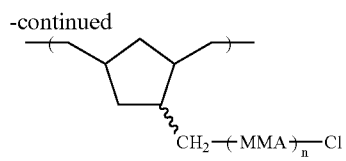

Example 12

Preparation of a Functional Copolynorbornene Containing Carbazole Groups and Polystyrnene Segments To an ampoule, Cu(I)Br (1 mmol), 2,2'-bipyridine (1 mmol), norbornene methylene bromide (NBMBr) (1 mmol) and styrene(St) (100 mmol) were added in 10 mL toluene. The heterogeneous mixture was placed under vacuum and then degassed via a freeze-pump-thaw cycle thrice. After degassing, the reaction mixture in ampoule was stirred at 100° C. for 12 hrs. The macromonomer containing polystyrene segments (NBMPStBr) was precipitated from methanol. Polymer was dissolved in THF and reprecipitated from methanol three times. Number average molecular weight of (NBMPStBr) is 160000 and PDI is 1.28 (by GPC).

Furthermore, copolymerization of a macromonomer containing polystyrene segments (NBMPStBr) and a carbazole-containing norbornene derivative was carried out by ring-opening metathesis polymerization. A functional copolynorbornene containing carbazole groups and polystyrnene segments was obtained.

Figure 4A:
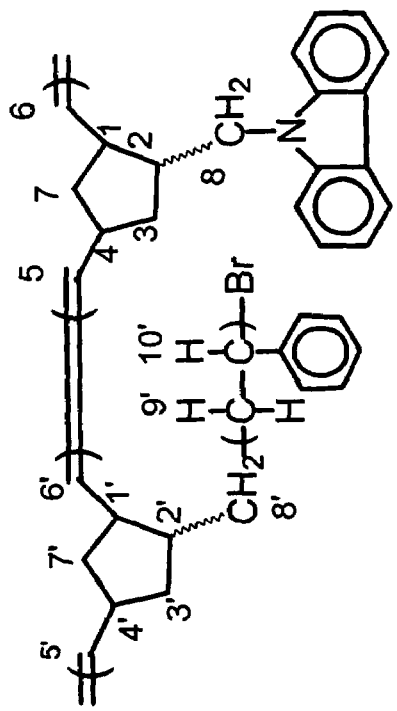
FIG. 4 and FIG. 4A show 400 MHz $^1$H NMR spectrum obtained in $CDCl_3$ at 25° C. for branched random poly(NBCbz-co-NBMPStBr).
Figure 4:
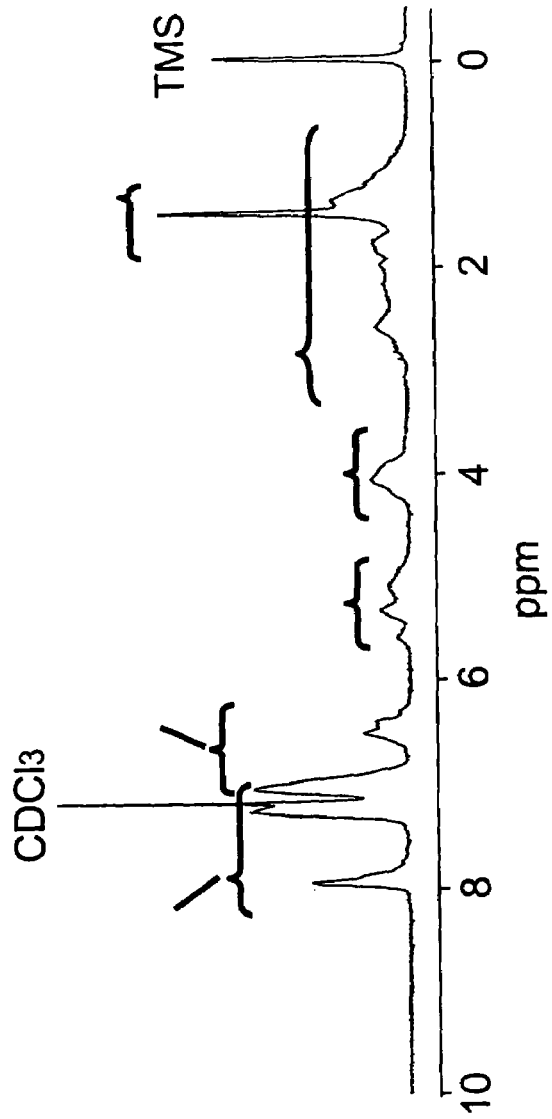

The $^1$H NMR (400 MHz) spectrum of branched random poly(NBCbz-co-NBMPStBr) obtained in CDCl$_3$ at 25° C. which is shown in FIG. 4 and FIG. 4A.

Number average molecular weight of poly(NBCbz-co-NBMPStBr) is 399000 and PDI is 1.30, yield=95%.

Thermal properties were determined by DSC: Tg=105° C. [Poly(styrene) segment] and Tg=165° C. [Poly(NBCbz) segment].

The structure of poly(NBCbz-co-NBMPStBr) is shown in the following scheme:

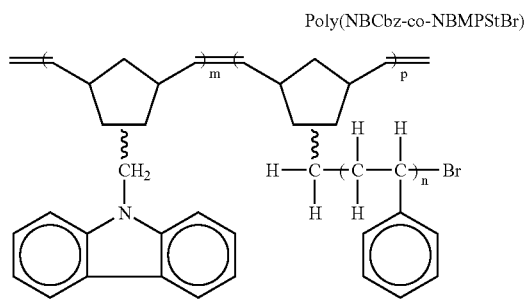

Poly(NBCbz-co-NBMPStBr)

Example 13

Preparation of Norbornene Methylene Amine (NBMA)

The norbornene derivative of norbornene methylene amine (NBMA) is mainly produced by the reaction of cyclopentadiene (66 g) and allyl amine (50 g). The required reaction condition of the Diels-Alder reaction in the present invention is usually controlled at 180° C. for 8 hrs in the presence of hydroquinone (1 g) as a inhibitor. The boiling point of allyl amine is 55–58° C., so the reaction needs to be carried out in a autoclave. The resulting solution is distilled under vacuum to obtain norbornene methylene amine (NBMA) (bp=59~61° C./11 mmHg).

The synthetic scheme is shown as following:

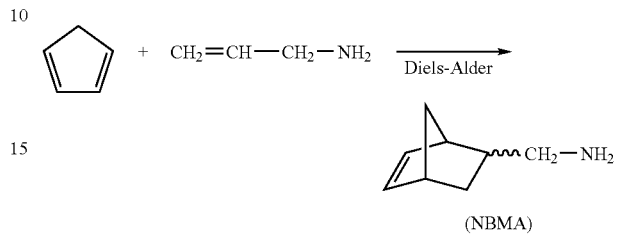

Example 14

Preparation of a Functional Norbornene Containing 2-bromo-2-methyl propionyl end group [2-bromo-2-methyl propionyl methyl]bicyclo[2,2,1]hept-2-ene; NBTMBr]

The monomer, (2-bromo-2-methyl propionyl methyl)bicyclo[2,2,1]hept-2-ene, was prepared via the reaction of 5-norbornen-2-methylene amine (NBMA) and 2-bromo-2-methylpropionyl bromide. A solution of 5-norbornen-2-methylene amine (1.11 g, 1 mmol) in methylene chloride (30 mL) and triethylamine (TEA) (1.01 g, 1 mol) were charged into a flask (150 mL) maintained at 0° C. in an ice bath. 2-Bromo-2-methylpropionyl bromide (2.30 g, 1 mol) was dissolved in methylene chloride (20 mL), then added to the above solution by a drop funnel over a period of 30 min and stirred for another 1 hr. After completion of the reaction, the organic layer was washed with distilled water (four times) and dried over sodium sulfate. After removing the solvent, a light yellow solid, 2-bromo-2-methyl propionyl-containing functional norbornene derivative[(2-bromo-2-methyl propionyl methyl)bicyclo[2,2,1]hept-2-ene; NBTMBr], was obtained. The functional norbornene monomer[(2-bromo-2-methyl propionyl methyl)bicyclo[2,2,1]hept-2-ene; NBTMBr] was purified by crystallization from n-hexane; m.p.=84.9° C. (by DSC) and exo/endo was measured to be 15:85 both by $^1$H NMR and $^{13}$C NMR spectroscopies. Elemental ANAL. Calculated for $C_{15}H_{21}O_4N$: C, 52.94%; H, 6.62%; N, 5.15%. found: C, 52.80%; H, 6.52%; N, 4.98%. The $^1$H NMR and $^{13}$C NMR spectra of the functional norbornene monomer[(2-bromo-2-methyl propionyl methyl)bicyclo[2,2,1]hept-2-ene; NBTMBr] agree satisfactorily with the proposed structure.

$^1$H NMR (CDCl$_3$): δ(ppm)=0.5 ($H_{n3n}$), 1.2 ($H_{x3x}$), 1.3 ($H_{n7a}$), 1.37 ($H_{n7s}$), 1.5 ($H_{x7as}$), 1.54 ($H_{x2n}$), 1.7 ($H_{n3x}$), 1.8 ($H_{10}$), 2.2 ($H_{n2x}$), 2.54 ($H_{x4}$), 2.75 ($H_{n4}$), 2.78 ($H_{x1}$), 2.85 ($H_{x1}$), 2.9 ($H_{n8}$), 2.97 ($H_{x8}$), 5.9 ($H_{n6}$), 6.0 ($H_{x5}$, $H_{x6}$), 6.1 ($H_{n5}$), 6.73 ($H_9$). $^{13}$C NMR (CDCl$_3$): δ(ppm)=30 ($C_{n3n}$), 30.7 ($C_{x3x}$), 32.6 ($C_{10}$), 38.7 ($C_{x2}$), 39.0 ($C_{n2x}$), 42.5 ($C_3$), 44.3 ($C_{x1}$), 44.4 ($C_{x4}$), 45.2 ($C_{n4}$), 45.6 ($C_{n1}$), 49.7 ($C_{x7}$), 63.5 ($C_{n8}$), 132.1 ($C_{n7}$), 136.3 ($C_{x6}$), 137 ($C_{n5}$), 171.5 ($C_9$).

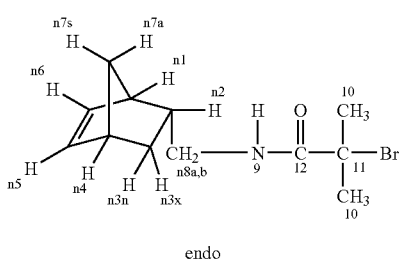

(NBTMBr)

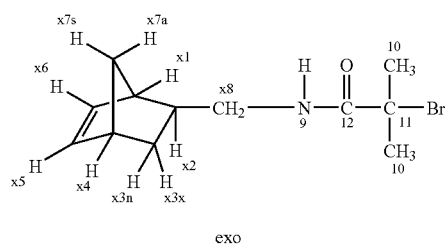

exo

Melting point: 84.9° C.

Solubility: 2-Bromo-2-methyl propionyl-containing functional norbornene derivative[(2-bromo-2-methyl propionyl methyl)bicyclo[2,2,1]hept-2-ene; NBTMBr] is soluble in acetone, pyridine, ethanol, methanol, methylene chloride, tetrahydrofuran, N,N-dimethylformamide (DMF) and dimethylsulfoxide (DMSO) at room temperature; completely in N,N-dimethylacetamide (DMAc) at 60° C.; and partially in toluene, benzene, hexane and N-methyl-2-pyrrolidinone (NMP) at 60° C.

The preparation of 2-bromo-2-methyl propionyl-containing functional norbornene derivative[(2-bromo-2-methyl propionyl methyl) bicyclo[2,2,1]hept-2-ene; NBTMBr] is shown in the following scheme:

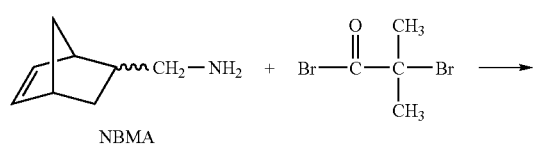

NBMA

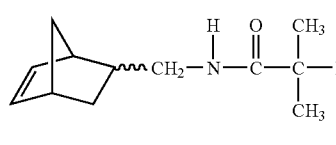

NBTMBr

Similarly, various functional norbornene derivatives can be obtained as shown in the following scheme:

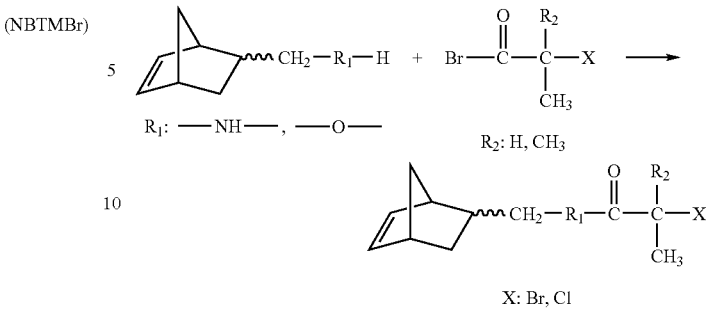

$R_1$: —NH—, —O—

$R_2$: H, $CH_3$

X: Br, Cl

Example 15

Preparation of Polynorbornene Containing Bromo-Side Group, (2-bromo-2-methyl propionyl methyl)bicyclo[2,2,1]hept-2-ene [poly(NBMBrMP)]

For example, preparation of functional polynorbornene containing 2-bromo-2-methyl propionyl-side group, (methyl)bicyclo[2,2,1]hept-2-ene [poly(NBMBrMP)] is carried out with [M]/[I]=520. A solution of catalyst was prepared by dissolving $RuCl_2(CHPh)[P(C_6H_{11})_3]_2$ (0.001 g, $1.22\times10^{-6}$ mol) in 1 mL of anhydrous methylene chloride in an argon-filled dry box. The monomer (0.22 g, $1.22\times10^{-3}$ mol) was dissolved in 5 mL of methylene chloride and then degassed via a freeze-pump-thaw cycle. After complete degassing the reaction mixture, the catalyst solution was injected into the monomer solution by syringe. The pink solution was vigorously stirred at room temperature for 24 hr and the color changed from pink to yellow. The reaction was terminated by the addition of a small amount of ethyl vinyl ether (0.5 mL). After termination, the solution was stirred for an additional 5 min and the polymer, poly (NBMBrMP), was precipitated in excess of methanol and dried overnight in a vacuum system at room temperature to give a flaky white solid.

$^1$H NMR ($CDCl_3$): $\delta$(ppm)=5.5~5.2 ($H_5$, $H_6$), 1.9 ($H_{10}$), 7.2 ($H_9$), 3.8~0.8 ($H_1$, $H_2$, $H_3$, $H_4$, $H_7$, $H_8$). $^{13}$C NMR ($CDCl_3$): $\delta$24.6~52.5 ($C_1$, $C_2$, $C_3$, $C_4$, $C_8$), 67.0 ($C_{11}$), 129.0~134.1 ($C_5$, $C_6$), 170.8 ($C_{12}$). The $^1$H NMR and $^{13}$C NMR spectra agree satisfactorily with the proposed structure.

Polymerization of the functional norbornene containing a halo end group was carried out with various [M]/[I] ratios by ring-opening metathesis polymerization. The resulting functional polynorbornene with various molecular weights and PDI values derived from the functional norbornene was obtained. [M]/[I]=260, $\overline{Mn}$=45000, $\overline{Mw}/\overline{Mn}$=1.22; [M]/[I]=425, $\overline{Mn}$=138000, $\overline{Mw}/\overline{Mn}$=1.33; [M]/[I]=520, $\overline{Mn}$=139000, $\overline{Mw}/\overline{Mn}$=1.35; [M]/[I]=780, $\overline{Mn}$=200000, $\overline{Mw}/\overline{Mn}$=1.42; [M]/[I]=1100, $\overline{Mn}$=314000, $\overline{Mw}/\overline{Mn}$=1.56.

Solubility: The poly(NBMBrMP) ([M]/[I]=520) containing bromo side chains is soluble in pyridine, methylene chloride, tetrahydrofuran (THF), N,N-dimethylformamide (DMF) and N-methyl-2-pyrrolidinone (NMP) at room temperature; completely in benzene, N,N-dimethylacetamide (DMAc) and dimethylsulfoxide (DMSO) at 60° C.; and partially in toluene at 60° C.

The synthetic scheme is shown as following:

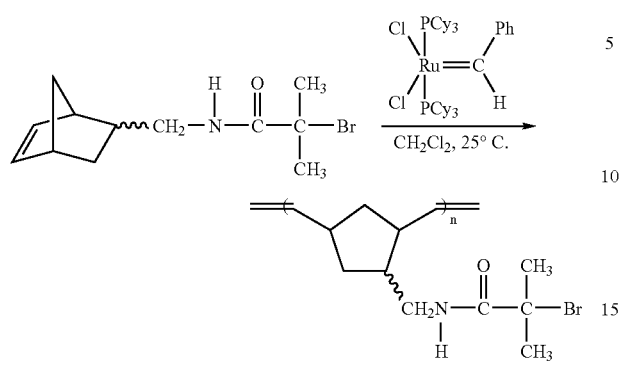

Example 16

Hydrogenation of Polynorbornene Containing Bromo-Side Group, poly{(2-bromo-2-methylpropionylmethyl)bicyclo[2,2,1]hept-2-ene} [poly(NBMBrMP)]

Poly(NBMBrMP) (0.5 g) was dissolved in 50 mL of xylene in an ampoule. To the above solution 2.75 g (7.5 equiv. relative to the repeating unit) of p-toluenesulfonylhydrazide as a hydrogenation agent and a trace of 2,6-di-tert-butyl-4-methylphenol were added. The ampoule containing the polymer, solvent and hydrogenation agent was then degassed thrice via a freeze-pump-thaw cycle and sealed. Then, it was gradually heated to 120° C. A homogeneous solution resulted at 100° C. The solution was stirred at 120° C. for 3 hr until the generation of gas bubbles ceased. The solution was cooled to room temperature and polymer was precipitated in methanol. The polymer was purified by reprecipitation in methanol. The hydrogenated polymer, hydrogenated poly(NBMBrMP), was dried under vacuum overnight at room temperature.

$^1$H NMR (CDCl$_3$): δ 0.8~3.8 ($H_1$, $H_2$, $H_3$, $H_4$, $H_5$, $H_6$, $H_7$, $H_8$), 1.9 ($H_{10}$), 6.7 ($H_9$). $^{13}$C NMR (CDCl$_3$): δ 18.7~50.0 ($C_1$, $C_2$, $C_3$, $C_4$, $C_8$), 67.7 ($C_{11}$), 170.8 ($C_{12}$).

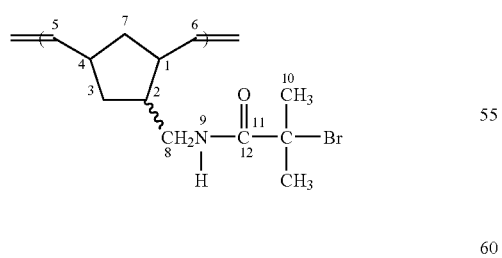

Solubility: The hydrogenated poly(NBMBrMP) is soluble in pyridine and methylene chloride at room temperature; completely in N,N-dimethylacetamide (DMAc) and N,N-dimethylformamide (DMF) at 60° C.; and partially in tetrahydrofuran (THF), ethyl acetate (EA), N-methyl-2-pyrrolidinone (NMP) and dimethylsulfoxide (DMSO) at 60° C.

The synthetic scheme is shown as following:

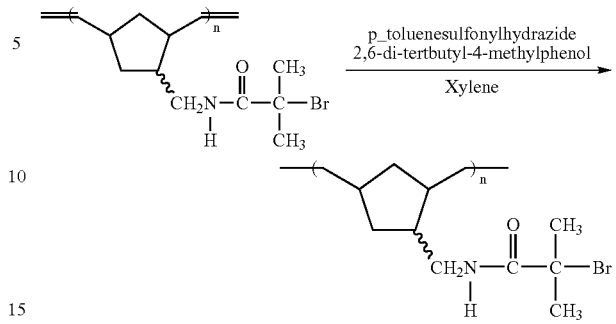

Example 17

Synthesis of Grafted Copolymer of Hydrogenated Poly(NBMBRMP) with Polymethyl Methacrylate Via ATRP To an ampoule, Cu(I)Br (0.143 g), 2,2'-bipyridine (0.156 g), hydrogenated poly(NBMBrMP)[poly(HNBMBrMP), $\overline{Mn}$=1.3×10$^4$, PDI=1.9] (0.5 g) and methyl methacrylate (1 g) were added in 50 mL toluene. The heterogeneous mixture was placed under vacuum and then degassed via a freeze-pump-thaw cycle thrice. After degassing, the reaction mixture in the ampoule was stirred at 100° C. for 12 hr. The polymer, poly(HNBMBrMP-g-PMMA) [$\overline{Mn}$=2.0×10$^4$, PDI=1.9], was precipitated from methanol. The polymer was purified by dissolving in THF and reprecipitating from methanol three times. $^1$H NMR (CDCl$_3$): δ(ppm)=0.8~3.8 ($H_1$, $H_2$, $H_3$, $H_4$, $H_7$, $H_8$), 1.9 ($H_{10}$), 6.7 ($H_9$). $^{13}$C NMR (CDCl$_3$): δ 29.9~63.9 ($C_1$, $C_2$, $C_3$, $C_4$, $C_5$, $C_6$, $C_7$, $C_8$, $C_e$, $C_f$, $C_g$), 172.1~172.3 ($C_i$, $C_{12}$).

The synthetic scheme is shown as following:

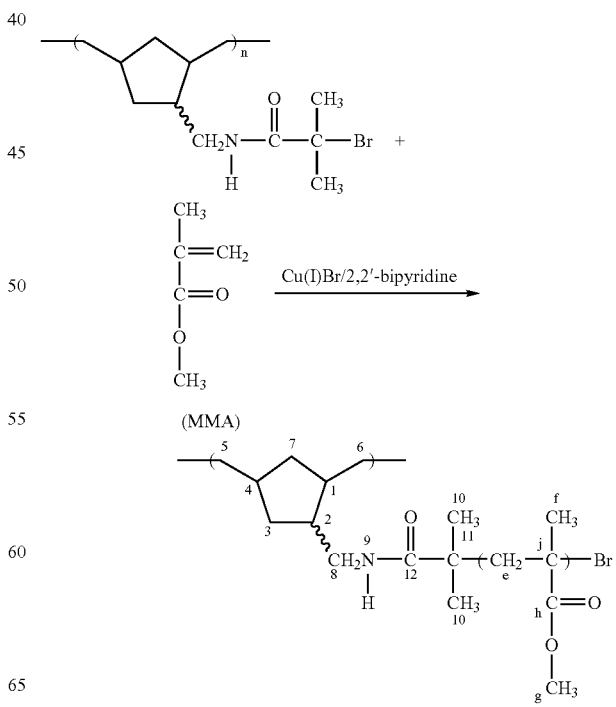

Example 18

Preparation of Bromo-Containing α-Norbornyl Polymethyl Methacrylate Macromonomer (NBPMMA) Via Atom Transfer Radical Polymerization Simple alkyl halides were used for atom transfer radical polymerization as initiators and copper(I) complexes as catalysts. Both of these are inexpensive and readily available.

To an ampoule, Cu(I)Br (0.71 g), 2,2'-bipyridine (0.65 g), 2-bromo-2-methyl propionyl methyl}bicyclo [2,2,1]hept-2-ene (1.3 g) and methacrylate (5 g) were added. The heterogeneous mixture was placed under vacuum and then degassed via a freeze-pump-thaw cycle thrice. After degassing, the reaction mixture in the ampoule was stirred at 100° C. for 12 hrs. The polymer was purified by dissolving in THF and reprecipitating from methanol three times. $\overline{Mn}=6.4\times10^3$ and PDI=1.5 as measured by GPC. Yield=72%. The $^1$H NMR spectrum of the α-norbornyl polymethyl methacrylate macromonomer (NBPMMA) was recorded. The signals associated with the vinylic protons of norbornene were observed at 5.17~5.28 ppm. The signals due to saturated chain were in the region (1.0~3.5 ppm) and polymethyl methacrylate segment [—C$\overline{H_2}$C(CH$_3$)COOCH$_3$: 2.10 ppm; —CH$_2$C(C$\underline{H_3}$)COOCH$_3$: 0.87, 1.04, 1.90 ppm; —CH$_2$C(CH$_3$)COOC$\underline{H_3}$: 3.60 ppm] of the spectrum provided further confirmation of the macromonomer (NBPMMA) structure. $^{13}$C NMR (CDCl$_3$): δ 17.0~68.0 (C$_1$, C$_2$, C$_3$, C$_4$, C$_7$, C$_8$, C$_e$, C$_f$, C$_g$), 127.0~130.0 (C$_5$, C$_6$), 175.0~180.0 (C$_h$, C$_{12}$). The macromonomer (NBPMMA) had a glass transition temperature (Tg) of 110° C. for polymethyl methacrylate segment.

The macromonomer with various average number molecular weight ($\overline{Mn}$) and PDI values were prepared with various reaction time. The macromonomer with $\overline{Mn}=12900$ and $\overline{Mw}/\overline{Mn}=1.37$ was obtained after 12 hrs. The macromonomer with $\overline{Mn}=14700$, $\overline{Mw}/\overline{Mn}=1.44$ was obtained after 24 hrs. The macromonomer with $\overline{Mn}=16600$, $\overline{Mw}/\overline{Mn}=1.55$ was obtained after 48 hrs.

Solubility: Macromonomer (NBPMMA) is soluble in methylene chloride, tetrahydrofuran (THF), N,N-dimethylacetamide (DMAc), pyridine and dichorobenzene at room temperature and in acetone, pyridine, benzene, N,N-dimethylformamide (DMF), ethyl acetate (EA), N-methyl-2-pyrrolidinone (NMP) and dimethylsulfoxide (DMSO) at 60° C.

The synthetic scheme is shown in the following:

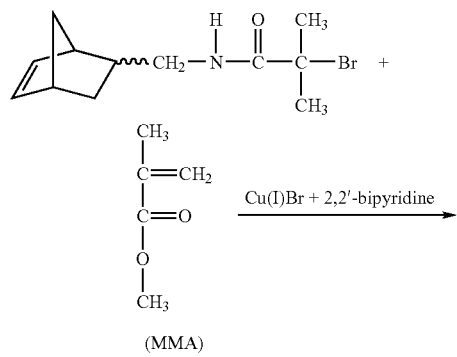

(MMA)

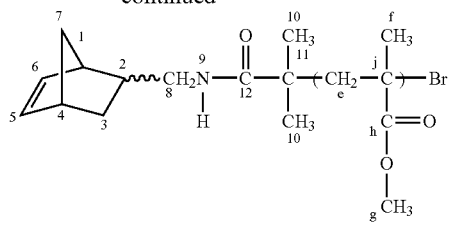

Example 19

Preparation of poly[α-norbornyl polymethyl methacrylate macromonomer-co-5-(N-carbazolyl methyl) bicyclo[2.2.1]hept-2-en], poly(NBPMMA-co-NB-Cbz), Via ring-opening metathesis polymerization The α-norbornyl polymethyl methacrylate macromonomer (NBPMMA) with molecular weight ($\overline{Mn}$) higher than $1.29\times10^4$ could not be homopolymerized via ring-opening metathesis polymerization (ROMP) by Ru catalyst [(Cy$_3$P)$_2$Cl$_2$Ru=CHPh, Cy=cyclohexyl]. Copolymerization was carried out with norbornene derivative such as 5-(N-carbazolyl methyl)bicyclo[2.2.1]hept-2-ene (NBCbz). The resulting copolymer exhibited electro-optical properties and good thermal stability.

A catalyst solution was prepared by dissolving 1 mg of [(Cy$_3$P)$_2$Cl$_2$Ru=CHPh, Cy=cyclohexyl] in 1 mL of anhydrous methylene chloride under an argon-filled drybox. The α-norbornyl polymethyl methacrylate macromonomer (NBPMMA) (0.1 g) with $\overline{Mn}=1.29\times10^4$ and NBCbz (0.1 g) were dissolved in 5 mL of methylene chloride and the reaction mixture was degassed via a freeze-pump-thaw cycle thrice. After it was degassed completely, the catalyst solution was injected into the mixture by a syringe. The reaction mixture was stirred at 25° C. for 2 hrs. The random copolymer was precipitated from methanol and purified by dissolving in THF and reprecipitating from methanol three times. $\overline{Mn}=4.76\times10^4$ and PDI=1.78 (GPC). The structure of poly(NBPMMA-co-NBCbz) was confirmed by $^1$H NMR spectroscopy.

The synthetic scheme is shown as following:

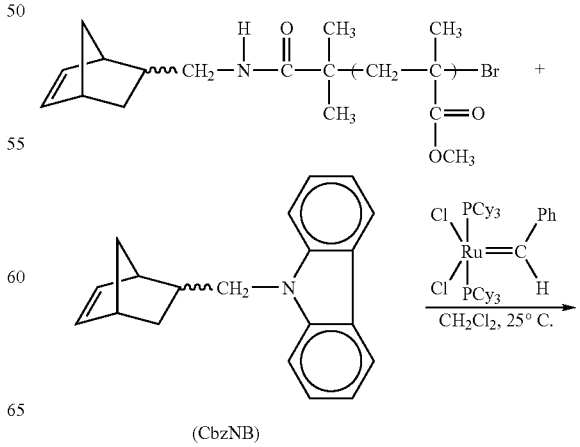

(CbzNB)

-continued

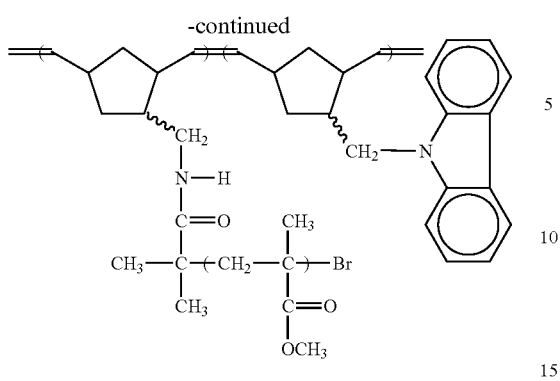

Figure 5:
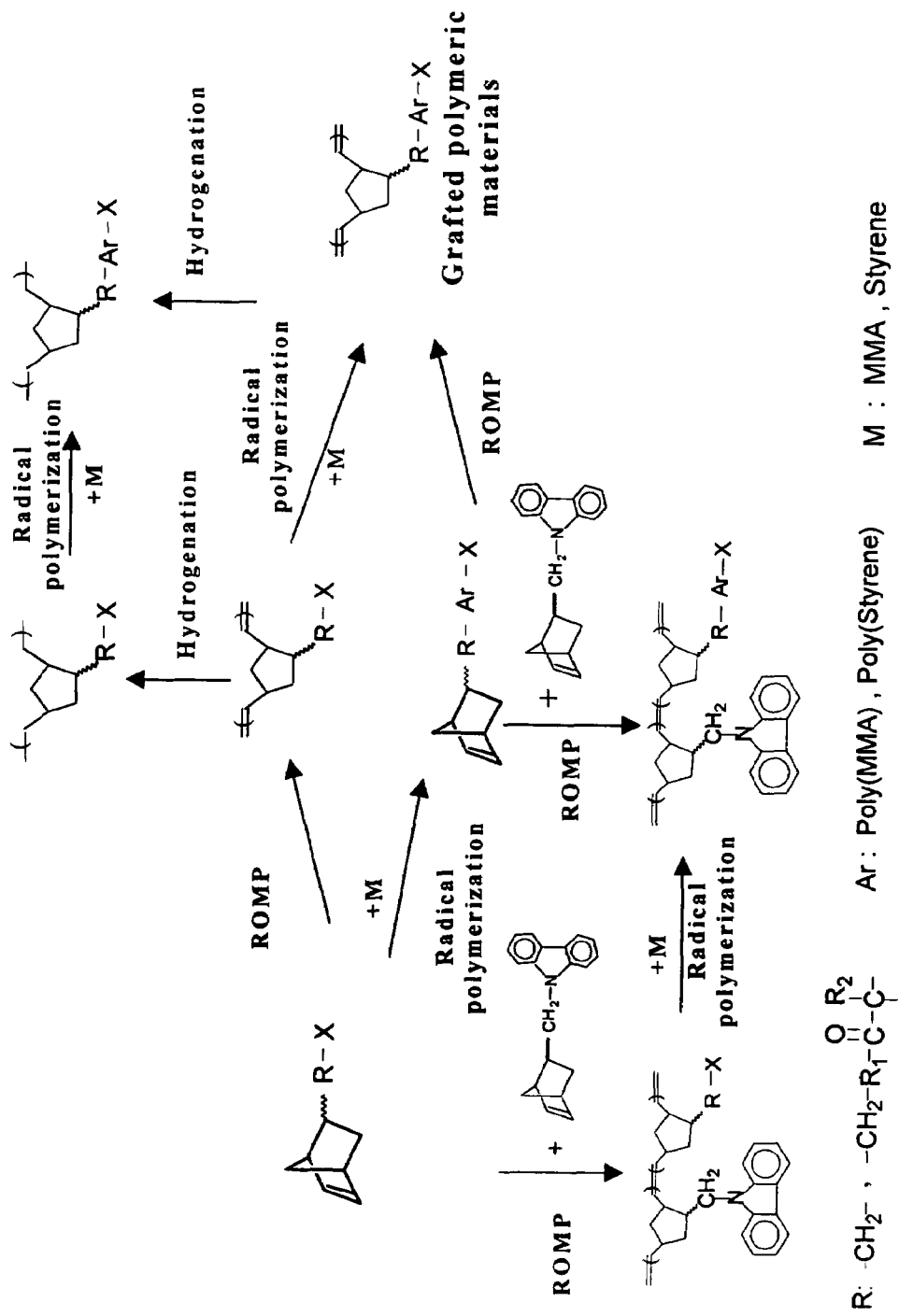
FIG. 5 shows a schematic drawing for various architectures and preparations according to the present invention.

Furthermore, various architectures and preparations according to present invention can be described with reference to a schematic drawing as shown in FIG. 5.

The present invention provides a series of novel norbornene-type monomers which can be an initiator for free-radical polymerization and a method for preparations of the monomers. A series of novel polymeric derivatives can be obtained by ring-opening metathesis polymerization, grafting polymerization and radical polymerization. The molecular weights of resulting polymeric derivatives are controllable. The polymers disclosed in the present invention are transparent, excellent in heat resistance and optical characteristics. The resulting polymeric derivatives not only show the specific characteristic due to norbornene and polynorbornene but also provide an enhanced properties.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What we claim is:

1. A diblock macroinitiator containing norborene and carbazole segments comprising the formula (I):

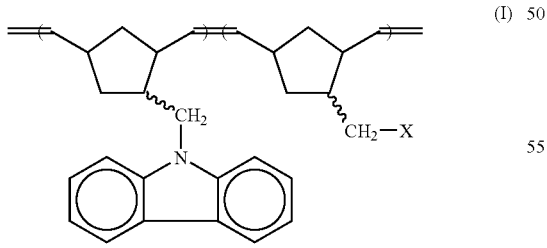

wherein, X is one selected from a group consisting of Br and Cl.

2. The diblock macroinitiator according to claim 1, wherein, said diblock macroinitiator is prepared from a mixture of cabazole-containing norbornene monomer (II) in the presence of catalyst via ring-opening metathesis polymerization, an additional norbornene dervative(III) is added into the mixture after 15–120 mins of commencing ring-opening metathesis polymerization and said diblock macroinitiator is obtained, wherein,

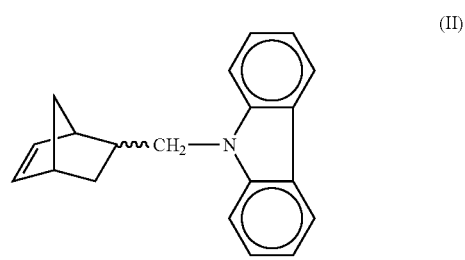

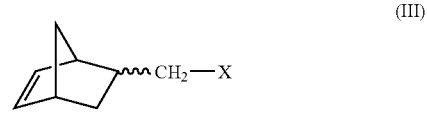

wherein, X is one selected from a group consisting of Br and Cl.

3. The diblock macroinitiator according to claim 2, wherein, said metathesis catalyst is $\{Cl_2Ru(CHPh)[P(C_6H_{11})_3]_2\}$.

4. A polynorbornene-containing grafted copolymer comprising the formula (IA), which is prepared by using a diblock macroinitiator with the formula (I):

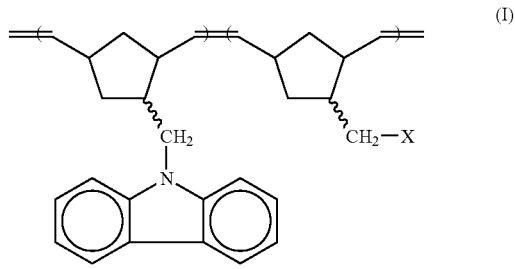

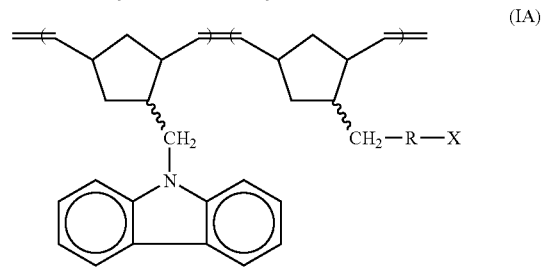

wherein, X is one selected from a group consisting of Br and Cl; and

R is one selected from a group consisting of

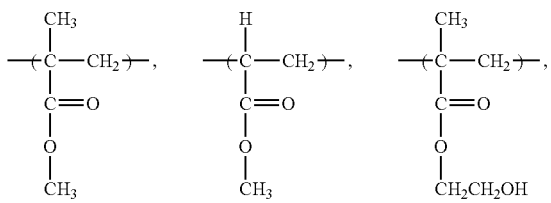

-continued

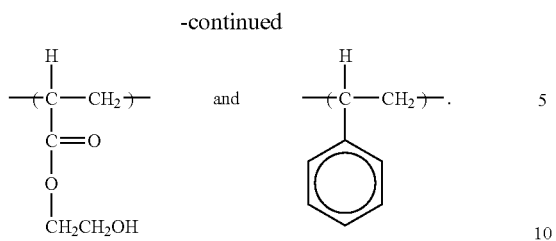

5. A method for preparing a grafted polynorbornene with the formula (IA) comprises of following steps:

a) Preparation of a macroinitiator with the formula (I) by means of reaction of cabazole-containing norbornene monomer (II) and a catalyst via ring-opening metathesis polymerization and addition of additional norbornene derivative(III) into the mixture after 15–120 mins of commencing ring-opening metathesis polymerization;

b) preparation of a mixture of Cu(I)Br, 2,2'-bipyridine, said macroinitiator (I) and a monomer selected from a group consisting of

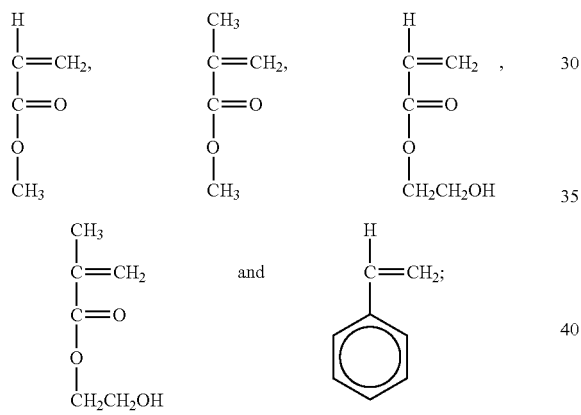

c) preparation of said grafted polynorbornene copolymer with the formula (IA) by means of a graft copolymerization of said mixture at various temperatures ranged from 50 to 150° C., wherein,

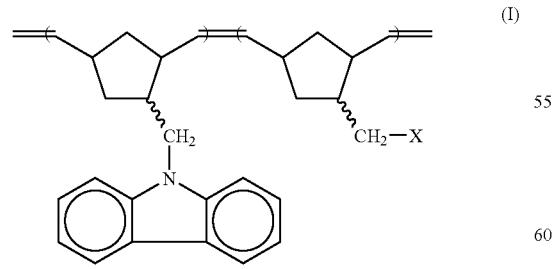

(I)

-continued

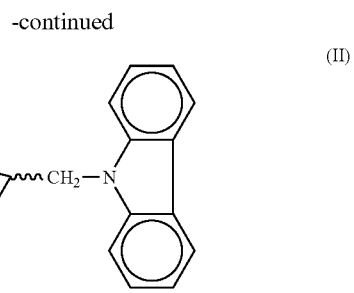

(II)

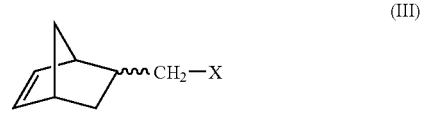

(III)

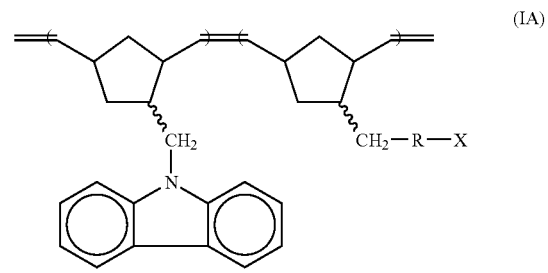

(IA)

wherein, X is one selected from a group consisting of Br and Cl; and

R is one selected from a group consisting of

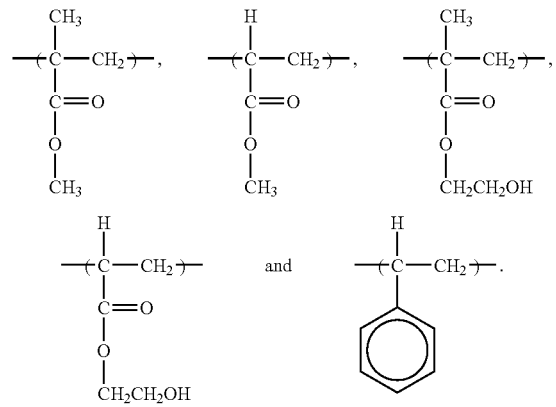

* * * * *